(12) United States Patent
Linsky et al.

(10) Patent No.: US 7,643,463 B1
(45) Date of Patent: Jan. 5, 2010

(54) METHOD AND APPARATUS FOR A DUAL-MODE RADIO IN A WIRELESS COMMUNICATION SYSTEM

(75) Inventors: Joel B. Linsky, San Diego, CA (US); Terrance R. Bourk, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 857 days.

(21) Appl. No.: 10/216,082

(22) Filed: Aug. 8, 2002

(51) Int. Cl.
*H04B 7/208* (2006.01)
*H04J 3/22* (2006.01)
*H04M 1/00* (2006.01)

(52) U.S. Cl. .................. 370/344; 370/465; 455/552.1

(58) Field of Classification Search ............... 370/252, 370/310, 331, 464, 465, 466, 467; 455/127.4, 455/553.1
See application file for complete search history.

(56) References Cited

U.S. PATENT DOCUMENTS

| | | | | |
|---|---|---|---|---|
| 6,526,264 | B2 * | 2/2003 | Sugar et al. .................. 455/84 |
| 6,560,443 | B1 * | 5/2003 | Vaisanen et al. .............. 455/73 |
| 6,657,987 | B1 * | 12/2003 | Kumar et al. ................ 370/346 |
| 6,681,261 | B2 * | 1/2004 | Mancusi et al. ............. 709/250 |
| 6,704,293 | B1 * | 3/2004 | Larsson et al. .............. 370/255 |
| 6,895,255 | B1 * | 5/2005 | Bridgelall .................. 455/552.1 |
| 6,920,171 | B2 * | 7/2005 | Souissi et al. ............... 375/133 |
| 6,990,082 | B1 * | 1/2006 | Zehavi et al. ............... 370/280 |
| 7,031,945 | B1 * | 4/2006 | Donner ....................... 705/64 |
| 7,099,671 | B2 * | 8/2006 | Liang ......................... 455/450 |
| 7,127,210 | B2 * | 10/2006 | Aoyagi ....................... 455/41.2 |
| 7,149,474 | B1 * | 12/2006 | Mikhak ....................... 455/41.2 |
| 7,180,876 | B1 * | 2/2007 | Henry et al. ................ 370/329 |
| 7,184,707 | B2 * | 2/2007 | Tada et al. .................. 455/41.3 |
| 7,194,283 | B2 * | 3/2007 | Kardach et al. ............. 375/130 |
| 2001/0010689 | A1 * | 8/2001 | Awater et al. ............... 370/344 |
| 2002/0173272 | A1 * | 11/2002 | Liang et al. .................. 455/63 |
| 2002/0176445 | A1 * | 11/2002 | Melpignano ................ 370/480 |
| 2004/0025065 | A1 * | 2/2004 | Lou ............................ 713/300 |

OTHER PUBLICATIONS

"Specification of the Bluetooth System", Specification vol. 1, Version 1.1, Part B, Section 1, pp. 41-42, Section 2.1, p. 43. Section 4.1-2, pp. 47-50, Section 10.9, p. 120 and Section 11, pp. 126-137, published Feb. 22, 2001.
Intersil Data Sheet, File No. 8000.1. pp. 1-46. published Nov. 2001.

* cited by examiner

*Primary Examiner*—Chi H Pham
*Assistant Examiner*—Warner Wong
(74) *Attorney, Agent, or Firm*—Abdollah Katbab; Darren M. Simon

(57) ABSTRACT

The present invention is a novel method and apparatus for a dual-mode radio (DMR) in a wireless communication system. The present invention allows Bluetooth™ protocol and 802.11 protocol devices to co-exist. The present inventive method classifies Bluetooth™ protocol and 802.11 protocol events according to importance. In the basic dual-mode radio method, the present invention assigns two levels of importance or priority Bluetooth™ events: "high" and "low". In the enhanced dual-mode radio method, the present invention assigns three levels of importance or priority to Bluetooth™ events: "high", "low" and "promotable". The present inventive apparatus provides a means for disabling 802.11 transmissions when high-priority Bluetooth™ events are detected.

95 Claims, 9 Drawing Sheets

SLAVE DEVICE

600'

METHOD AND APPARATUS FOR A DUAL-MODE RADIO IN A WIRELESS COMMUNICATION SYSTEM

BACKGROUND OF THE INVENTION

1. Field of the Invention

This invention relates to Bluetooth™ and 802.11 wireless communication systems, and more particularly to a method and apparatus for a dual-mode radio in a wireless communication system.

2. Description of Related Art

Wireless communication systems facilitate high-speed connectivity and data and voice transport from point-to-point and point-to-multipoint bases. Exemplary wireless communication systems include "Bluetooth™[1] protocol" systems that facilitate the transport of data between Bluetooth™ devices such as wireless headsets, cellular phones, laptop computers and personal digital assistants (PDAs), and "IEEE 802 protocol" systems that facilitate the transport of data over wireless local area networks (WLANs), which include devices such as desktop and laptop computers.

[1] Bluetooth™ is a trademark of Bluetooth SIG, Inc.

As is well known, Bluetooth™ is a global specification standard for radio communications operating at 2.4 GHz radio frequencies. Bluetooth™ devices (i.e., those that comply with the Bluetooth™ Specification) replace normal cable connections using short-range radio links. Bluetooth™ technology is featured in cordless telephony, intercom, FAX and LAN access, and dial-up networking applications. Bluetooth™ wireless communication protocols are implemented in wireless headsets, cellular phones, PDAs, printers, and other mobile devices. Bluetooth™ technology is described in more detail in a specification published by the Bluetooth™ Special Interest Group (SIG), entitled "Specification of the Bluetooth System, version 1.1", electronically available to the public via the well-known Internet at <http://www.Bluetooth.com>, published on Feb. 22, 2001, referred to herein as the "Bluetooth™ Specification", and incorporated for reference herein in its entirety for its teachings on Bluetooth™ flow control, signals, devices and communication protocols and schemes.

Bluetooth™ devices typically communicate with other Bluetooth™ devices using either a "piconet" communication network topology or a "scatternet" communication network topology. Details regarding the Bluetooth™ communication protocols, piconet and scatternet communication networks are described in detail in the Bluetooth™ Specification. Specifically, the piconet networks are described in Section 1 of Part B of the Bluetooth™ Specification. The scatternet networks are described in Section 10.9 of Part B of the Bluetooth™ Specification.

A piconet is defined in the Bluetooth™ Specification as a communication system including two or more Bluetooth™ devices that share a common frequency hopping pattern and a common "Access Word" (or "access code"). Access codes are pre-defined bit patterns that are transmitted to a Bluetooth™ device at the beginning of "data packets." In addition to providing other functions, access codes are used for device synchronization and identification purposes. As defined in detail in section 4.1 of the Bluetooth™ Specification, data is communicated between Bluetooth™ devices in the form of data packets. The data packets have a pre-determined format defined by the Bluetooth™ Specification. As defined therein, a data packet includes an "access code", a "packet header" and a "payload" of data bits. Details regarding packets and access codes are described in more detail in Section 4.1-2 of the Bluetooth™ Specification.

At a minimum, a piconet comprises two or more Bluetooth™ devices, such as, for example, a portable PC and a cellular phone that communicate with each other via the piconet. A piconet can comprise a maximum of eight connected devices. When establishing a piconet, one and only one Bluetooth™ device acts as a master device of the piconet. The master device initiates a connection to one or more slave devices. Any device in a piconet that is not a master device is, by definition, a slave device. Master-slave roles can be exchanged once a piconet is established. A master can become a slave, and a slave can become a master. Bluetooth™ master and slave devices utilize various Bluetooth™ protocols to exchange data.

Bluetooth™ wireless communication protocols aid in implementing various Bluetooth™ applications. Bluetooth™ applications utilize various links, or connections, to communicate between master and slave devices. As described in Part B, "Baseband Specification", Sections 2.1 and 11, of the Bluetooth™ Specification, Bluetooth™ communication systems use a frequency hopping spread spectrum (FHSS) scheme (referred to hereinafter as the "FH scheme") to communicate between master and slave devices. Frequency hopping modulation comprises the well-known method of repeatedly switching channels or frequencies during transmission of data. FH schemes require that the channel switching or "hopping" follow a specified algorithm so that devices can independently determine frequency-hopping (FH) sequences (i.e., they follow ordered lists of frequencies).

As described in the incorporated Part B, "Baseband Specification", Section 2.1, of the Bluetooth™ Specification, Bluetooth™ communication protocols determine FH sequences using the Bluetooth™ device address and the clock of a master device. The FH sequences are determined to allow associated slave devices on a piconet to independently determine the FH sequences. Bluetooth™ communication protocols use a Bluetooth™ FH kernel to select the FH sequences and to map the FH sequences to hop frequencies.

As is well known, the various IEEE 802.11 communication protocols (referred to hereinafter as "802.11") are global standards for radio communications operating at 2.4 GHz radio frequencies. One exemplary well-known IEEE 802.11 communications protocol is the IEEE 802.11b protocol (referred to hereinafter as "802.11b"). The 802.11b protocol allows 802.11b devices (i.e., those that comply with the 802.11b standard) to operate at high data transmission rates (e.g., 11 Mbps). The 802.11b protocol is particularly useful in implementing Wireless Local Area Networks (WLANs). 802.11b devices are described in more detail in a standard produced by the IEEE 802 Working Group, entitled "IEEE Std 802.11b-1999", electronically available to the public via the well-known Internet at <http://standards.ieee.org>, referred to herein as the "802.11b Specification", and incorporated for reference herein in its entirety for its teachings on 802.11b flow control, signals, devices and communication protocols and schemes. Another exemplary IEEE 802.11 communications protocol is the newly emerging IEEE 802.11g. Some embodiments of the invention are described below using the IEEE 802.11b protocol as an exemplary communications protocol. However, this is not meant as a limitation to the present invention as the present inventive method and apparatus contemplates use of any of the IEEE 802.11 communication protocols and future variants. Therefore, the generic "IEEE 802.11" term is used throughout the remainder of the specification to encompass all IEEE 802.11 communication protocols.

The 802.11 communications protocols (e.g., 802.11b) have options for FH schemes and direct sequence spread spectrum (DSSS) schemes (referred to hereinafter as "DS schemes") to communicate between devices on the WLAN. Direct sequence modulation comprises a well known method of transmitting data across a single channel without hopping to other channels. DS schemes commonly use data redundancy during transmission for error correction purposes. The 802.11b equipment currently manufactured typically uses only the DS schemes. From the point of view of the utilization of the ISM band the 802.11b DSSS equipment is distinct from the Bluetooth™ protocol equipment because the 802.11b DSSS equipment occupies a fixed allocation of bandwidth. Although the 802.11b standard defines 11 DSSS channels in the ISM band, 802.11b DSSS equipment typically uses only channels 1, 6 and 11. The 802.11b DSSS carriers have a 3 dB bandwidth around 11 MHz with first zeros in their spectrum 22 MHz apart. Thus, in a simple view, the 802.11 systems (e.g., 802.11b systems) and the Bluetooth systems interfere with one another when the Bluetooth™ protocol frequency hops within the 22 MHz segment corresponding to the channel used by the 802.11.

It is desirable to operate both Bluetooth™ protocol devices and 802.11 protocol devices within close proximity to one another. For example, a laptop can include both a Bluetooth™ protocol device for wireless communication with a Bluetooth™ wireless mouse and an 802.11 protocol device for wireless communication with an 802.11 WLAN access point.

Disadvantageously, heretofore when Bluetooth™ and 802.11 protocol devices operate in close proximity, interference can be produced adversely affecting communication using both protocols. Interference can be created because both protocols operate on the 2.4 GHz ISM frequency band. Specifically, over-air interference and saturation of one transmitter by another transmitter can occur when a Bluetooth™ protocol antenna is in close proximity (e.g., within one-half meter) of an 802.11 protocol antenna. As is well known, interference increases the probability of reception errors. In any data communication system, it is desirable to reduce reception errors.

Therefore, a need exists for a method and apparatus for a dual-mode radio that reduces reception errors in devices contemporaneously using both Bluetooth™ protocol and 802.11 protocol devices in close proximity. The method and apparatus should adequately maintain adequate data transmission rates for both protocols. The present invention provides such a dual-mode radio method and apparatus.

SUMMARY OF THE INVENTION

The present invention is a method and apparatus for a dual-mode radio (DMR) in a wireless communication system. The present invention provides coexistence between Bluetooth™ protocol and 802.11 protocol devices operating in a DMR.

The present inventive method classifies Bluetooth™ and 802.11 protocol events according to importance. Two methods, a basic DMR method and an enhanced DMR method, are described. In the basic DMR method, the present invention assigns two levels of importance or priority to Bluetooth™ events: high and low. A Bluetooth T event may be either a transmission or reception of Bluetooth™ packets. These priority assignments can be predetermined or selected during radio operation. The basic DMR method queues low-priority Bluetooth™ events until the 802.11 device enters radio link idle state, which is referred to hereinafter as "802.11 idle". During high-priority Bluetooth™ events, the basic DMR method prevents or disables the 802.11 device from transmitting (e.g., by interrupting its Tx enable signal) until the high-priority Bluetooth™ event is completed. In the basic DMR method, low-priority Bluetooth™ events are allocated almost zero bandwidth when the 802.11 device is active (i.e., when it is not operating in the 802.11 idle state). During the 802.11 idle state, the Bluetooth™ protocol uses as much bandwidth as possible for low-priority Bluetooth™ events.

In accordance with the enhanced DMR method, the present invention assigns Bluetooth™ events three levels of importance or priority: high, low and promotable. The basic and enhanced DMR methods define high and low priority events in a similar manner. Promotable priority events comprise events that the enhanced DMR method may subsequently promote from a low priority to a high priority depending on a specified parameter or set of parameters. In one embodiment, the DMR method can be characterized as a "bandwidth on demand" method because some bandwidth is guaranteed for the Bluetooth™ device regardless of the activity of the 802.11 device (i.e., bandwidth is allocated to the Bluetooth™ device whether or not the 802.11 device is idle). An exemplary method, referred to as a "QoS DMR" method, determines whether to promote a low-priority event to a high-priority using quality of service (QoS) configurations. For example, QoS parameters such as service type, token rate and latency can be used when allocating bandwidth in the DMR apparatus.

In one embodiment of the present invention, the inventive apparatus includes an 802.11 protocol device and a Bluetooth™ protocol device. The 802.11 protocol device includes an 802.11 radio and an 802.11 medium access control (MAC). The Bluetooth™ protocol device includes a Bluetooth™ radio and a Bluetooth™ MAC. The present inventive apparatus provides a means for disabling 802.11 transmissions when high-priority or low-priority promoted Bluetooth™ events are detected. In one embodiment, the Bluetooth™ MAC transmits Tx (transmit) disable commands directly to the 802.11 radio. In another embodiment, the Bluetooth™ MAC transmits Tx disable commands to the 802.11 MAC, which then subsequently transmits Tx disable commands to the 802.11 radio.

The present invention can be utilized in any wireless communication system that uses a DMR apparatus. The present invention reduces reception errors in devices using a DMR apparatus while adequately maintaining data transmission rates for both the Bluetooth™ and 802.11 protocols.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations to the present invention.

The present invention is a method and apparatus for a dual-mode radio (DMR) in a wireless communication system. The present invention provides "coexistence" or cooperation between co-located Bluetooth™ protocol and 802.11 protocol devices operating in a DMR. Coexistence refers to contemporaneous operation of devices using both protocols at adequate data transmission rates when the devices' antennas are within close proximity to one another and the devices transmit and receive in the same frequency band.

The present inventive method classifies Bluetooth™ protocol and 802.11 protocol events according to importance or priority. In one embodiment, referred to as the "basic DMR method", the present invention assigns two levels of importance or priority to protocol events: high and low. In another embodiment, referred to as the "enhanced DMR method", the present invention assigns three levels of importance or priority to protocol events: high, low and promotable.

The present inventive apparatus includes an 802.11 protocol device and a Bluetooth™ protocol device. The 802.11 protocol device includes an 802.11 radio and an 802.11 Medium Access Control (MAC). The Bluetooth™ protocol device includes a Bluetooth™ radio and a Bluetooth™ MAC. The inventive apparatus includes a means for disabling 802.11 transmissions during high-priority Bluetooth™ events. In one embodiment, the Bluetooth™ MAC transmits Tx (transmit) disable commands directly to the 802.11 radio. In another embodiment, the Bluetooth™ MAC transmits Tx disable commands to the 802.11 MAC, which subsequently disable transmissions by the 802.11 radio. An exemplary dual-mode radio apparatus adapted for use with the present invention is now described.

Exemplary Dual-Mode Radio (DMR) Adapted for Use with the Present Invention

Figure 1:
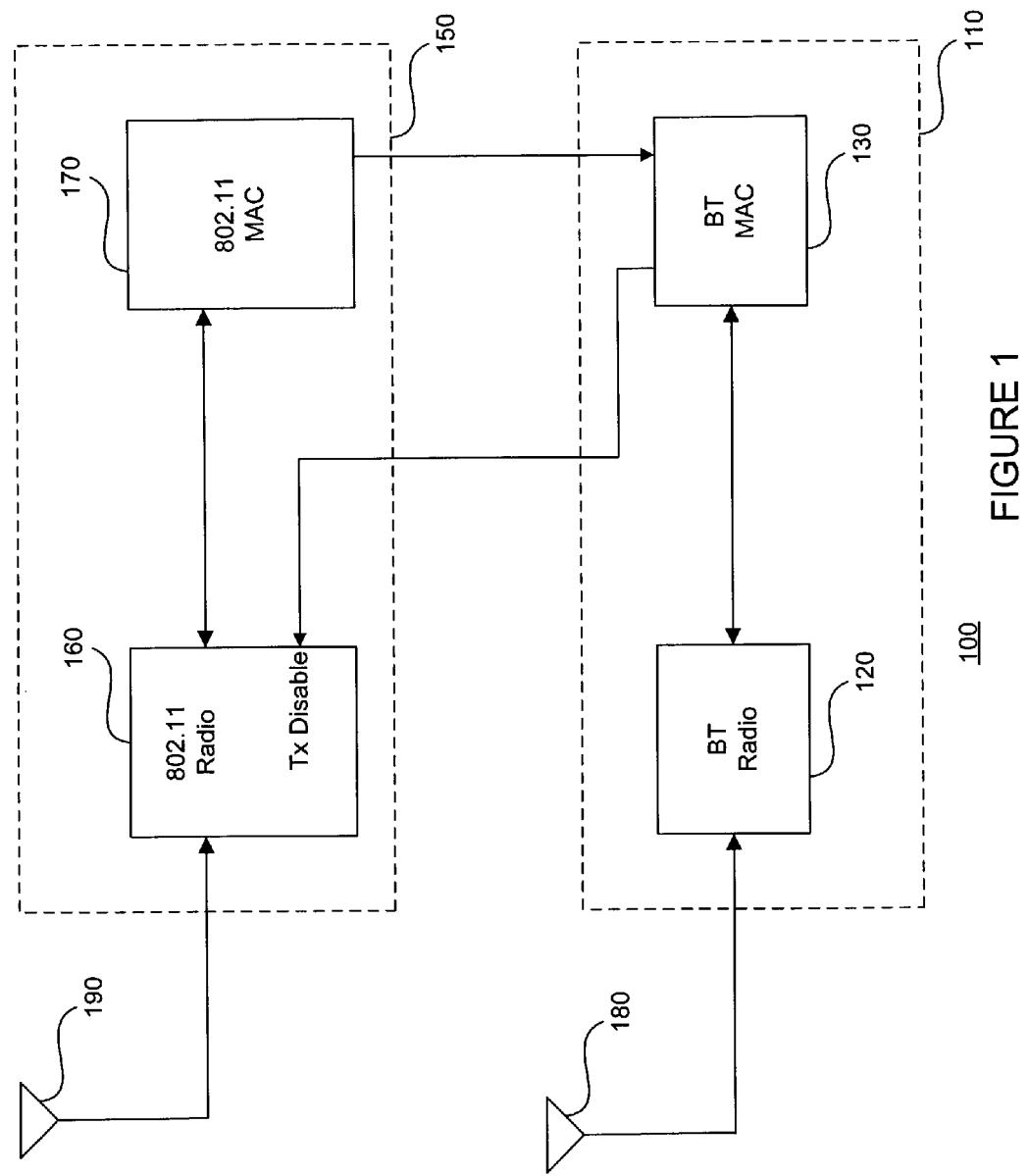
FIG. 1 is a block diagram showing a first exemplary dual-mode radio adapted for use with the present invention.

The exemplary dual-mode radio (DMR) provides coexistence for Bluetooth™ and 802.11 when co-located in the same device. Those skilled in the communication art shall recognize that the DMR of FIG. 1 is exemplary only, and therefore, is not meant to be a limitation to the present invention. Components of the exemplary DMR of FIG. 1 are described in greater detail in the incorporated Bluetooth™ and 802.11 specifications. A first exemplary DMR is now described with reference to FIG. 1.

FIG. 1 is a block diagram showing a first exemplary DMR for use with the present invention. As shown in FIG. 1, the first exemplary DMR apparatus 100 includes a Bluetooth™ (BT) device 110, an 802.11 device 150, an 802.11 antenna 190 and a Bluetooth™ antenna 180. The 802.11 device 150 is operatively coupled to the 802.11 antenna 190. The BT device 110 is operatively coupled to the Bluetooth™ antenna 180.

As shown in FIG. 1, the BT device 110 includes a BT radio 120 and a BT medium access control (MAC) 130. The 802.11 device 150 similarly includes an 802.11 radio 160 and an 802.11 MAC 170. As is well known, a MAC ensures that the physical medium (e.g., the 2.4 Ghz frequency band) is shared in a fair, consistent and efficient manner (i.e., at a high performance level). The MAC controls client access to the physical communication medium. The MAC determines when clients are allowed to transmit on the physical medium and when they are not allowed to transmit. In addition, if contentions are permitted, the MAC controls the contention process and resolves any collisions that may occur. The MAC is part of a layered data transport protocol wherein the lowest data transport layer is the physical signaling layer. The physical transport layer is used to interface the higher communication protocol layers with the shared physical medium.

The BT device 110 provides a means for the higher communication protocol Bluetooth™ communication layers to transmit and receive data through the antenna 190. As shown in FIG. 1, the BT MAC 130 is operatively coupled to the BT radio 120, the 802.11 MAC 170 and the 802.11 radio 160. When operating in BT transmission mode, the BT MAC 130 receives data from higher communication layers and transmits data to the BT radio 120 for transmission via the Bluetooth™ antenna 180. When operating in a BT reception mode, the BT MAC 130 receives data from the BT radio 120 via the Bluetooth™ antenna 180 and transmits data to communication higher layers. The BT MAC 130 receives information from the 802.11 MAC 170 regarding 802.11 status (e.g., 802.11 active or idle). The BT MAC 130 is capable of transmitting a transmit disable command to the 802.11 radio 160 via Tx Disable input of the 802.11 radio 160 via Tx Disable input of the 802.11 radio 160.

Similarly, the 802.11 device 150 provides a means for the higher communication protocol 802.11 communication layers to transmit and receive data through the 802.11 antenna 190. The 802.11 MAC 170 is operatively coupled to the 802.11 radio 160 and the BT MAC 130. When operating in an 802.11 transmission mode, the 802.11 MAC 170 receives data from higher communication layers and transmits data to the 802.11 radio 160 for transmission via the 802.11 antenna 190. When operating in an 802.11 reception mode, the 802.11 MAC 170 receives data from the 802.11 radio 160 and transmits data to higher communication layers. The BT MAC 130 samples the state of the 802.11 MAC 170 to determine whether the 802.11 device 150 is active or idle.

As described in more detail hereinbelow regarding the present DMR method, the present invention can use the first exemplary DMR 100 to provide coexistence between BT and 802.11 protocols. In one embodiment of the DMR method, the BT MAC 130 transmits a transmit disable command to the 802.11 radio 160 whenever the BT MAC 130 receives information regarding an 802.11 transmission event occurring in the 802.11 device 150. The information is communicated to the BT MAC 130 by the 802.11 MAC 170. The second exemplary DMR 200 is similar to the first exemplary DMR 100, and thus, identical components are not described herein.

Figure 2:
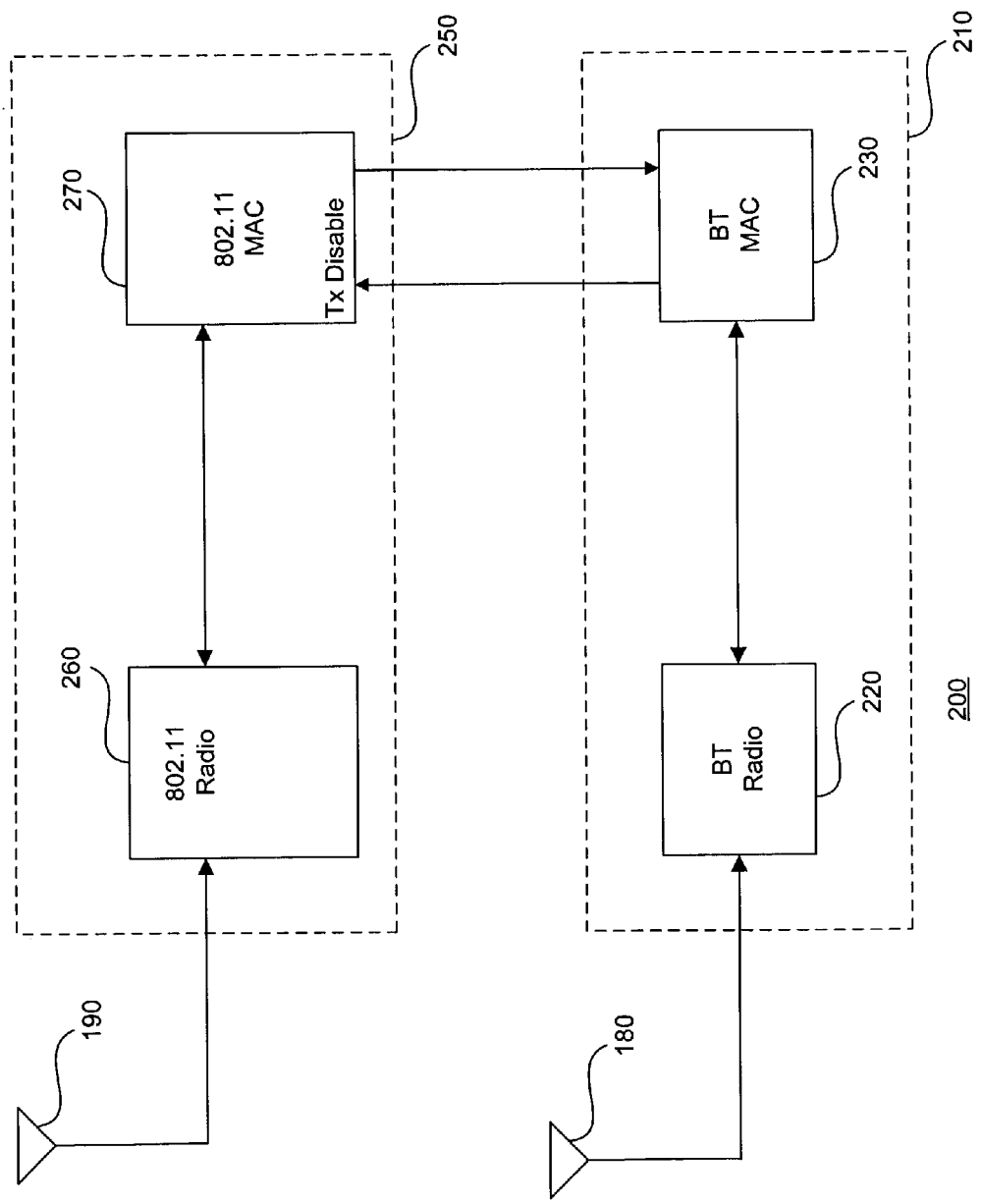
FIG. 2 is a simplified block diagram showing a second exemplary dual-mode radio adapted for use with the present invention.

As shown in FIG. 2, the BT device 210 includes a BT radio 220 and a BT MAC 230. The 802.11 device 250 includes an 802.11 radio 260 and an 802.11 MAC 270. The BT MAC 230 is operatively coupled to the BT radio 220 and the 802.11 MAC 270. The BT MAC 230 is capable of transmitting a transmit disable command to the 802.11 MAC 270 via a Tx Disable input.

The 802.11 device 250 provides a means for the higher 802.11 communication protocol layers to transmit and receive data through the 802.11 antenna 190. The 802.11 MAC 270 is operatively coupled to the 802.11 radio 260 and the BT MAC 230. The 802.11 MAC 270 transmits information to the BT MAC 230 regarding 802.11 operating state (e.g., 802.11 active or idle). The 802.11 MAC 270 receives a transmit disable command from the BT MAC 230. When the transmit disable signal is received by the MAC 270, the 802.11 MAC 270 disables 802.11 transmissions. In one embodiment, the 802.11 MAC 270 disables 802.11 transmissions via software. In another embodiment, the 802.11 MAC 270 disables 802.11 transmissions by transmitting disable transmit commands to the 802.11 radio 260. The present inventive dual-mode radio method is now described.

Dual-Mode Radio Method of the Present Invention

The present inventive dual-mode radio method provides Bluetooth™ and 802.11 functionality in a dual-mode radio. The DMRs described above with reference to FIGS. 1 and 2 are adapted for use with the present inventive DMR method. However, this is not meant to be a limitation to the present invention, as those skilled in the communication arts shall recognize that the inventive DMR method can be used with different DMRs without departing from the scope or spirit of the present invention.

When either the Bluetooth™ protocol or the 802.11 protocol in a DMR device has high volumes of user traffic, either protocol can utilize the radio channel predominantly to realize higher throughput. However, when both protocols have high volumes of user traffic, one or both protocols must decrease throughput because of sharing of the common physical medium of the ISM band.

The DMR method attempts to interleave the actions of Bluetooth™ and 802.11 protocols in a DMR apparatus to reduce perceived degradation in performance or reliability to users. As is well known, both Bluetooth™ and 802.11 protocols have "events", which are defined as control or user data transmissions or receptions. Some events (e.g., 802.11 beacons and Bluetooth™ LMP messages) are system critical, or very important to proper system operation, and thus, are referred to as "high-priority" events.

The present inventive DMR method classifies Bluetooth™ protocol events according to their importance. In one embodiment, referred to as the "basic DMR method", the present invention assigns two levels of importance or priority to Bluetooth™ protocol events: high and low. In another embodiment, referred to as the "enhanced DMR method", the present invention assigns three levels of importance or priority to Bluetooth™ protocol events: high, low and promotable.

The DMR method allows high-priority Bluetooth™ events to occur uninterrupted. Generally, high-priority Bluetooth™ events are short in duration with low duty cycles. In one embodiment, the DMR method defines the Bluetooth T events listed in TABLE 1 as high-priority Bluetooth™ events.

TABLE 1

Exemplary Bluetooth ™ High-Priority Events

1  Sniff slots (human interface device (HID) is covered in this rule)
2  Park beacons
3  Keep Alive NULLs (minimum every 200 ms)
4  Page Response/Inquiry Response sequences
5  Page Scanning/Inquiry Scanning
6  Master slave switch
7  LMP messages
8  Paging
9  Inquiry
10 Transmissions to prevent link supervision timeout
11 High priority L2CAP traffic (e.g., HID and VoIP)
12 Un-hold (until the response to the POLL is received)
13 Un-Sniff (until the response to the POLL is received)
14 Un-Park (until the response to the POLL is received)

The exemplary high-priority events listed in TABLE 1 are not meant to be an all-inclusive list. Those skilled in the communication art shall recognize that different events can be defined as high-priority Bluetooth™ events without departing from the scope or spirit of the present invention. A first DMR method is now described with reference to the flowchart of FIG. 3.

The first dual-mode radio method is referred to as the "basic DMR method". The basic DMR method assigns either high priority or low priority to Bluetooth™ protocol events. These priority assignments can be predetermined or dynamically selected during radio operation. The basic DMR method queues low-priority Bluetooth™ events until the 802.11 device enters the 802.11 idle state. For high-priority Bluetooth™ events, the basic DMR method prevents or disables the 802.11 device from transmitting (e.g., by interrupting its Tx enable signal) until the high-priority Bluetooth™ event is completed.

The first or basic DMR method can be implemented with the following enhancements. In a first enhancement, separate priorities are assigned for general "Sniff" events and "HID" events. In one embodiment, HID events are assigned highest priority, whereas, general Sniff events are assigned lower priority. In a second enhancement, "Page Scanning" and "Inquiry Scanning" are assigned high priority only during specified time intervals. For example, two consecutive scans are assigned high priority and the subsequent two consecutive scans are assigned low priority. In a third enhancement, both devices are allowed to contemporaneously transmit using different antennas. In a fourth enhancement, an additional input is added to the Bluetooth™ device from the 802.11 device that indicates when an active reception occurs. For example, the CCA output from the 802.11 baseband integrated circuit can be used for this purpose.

Figure 3:
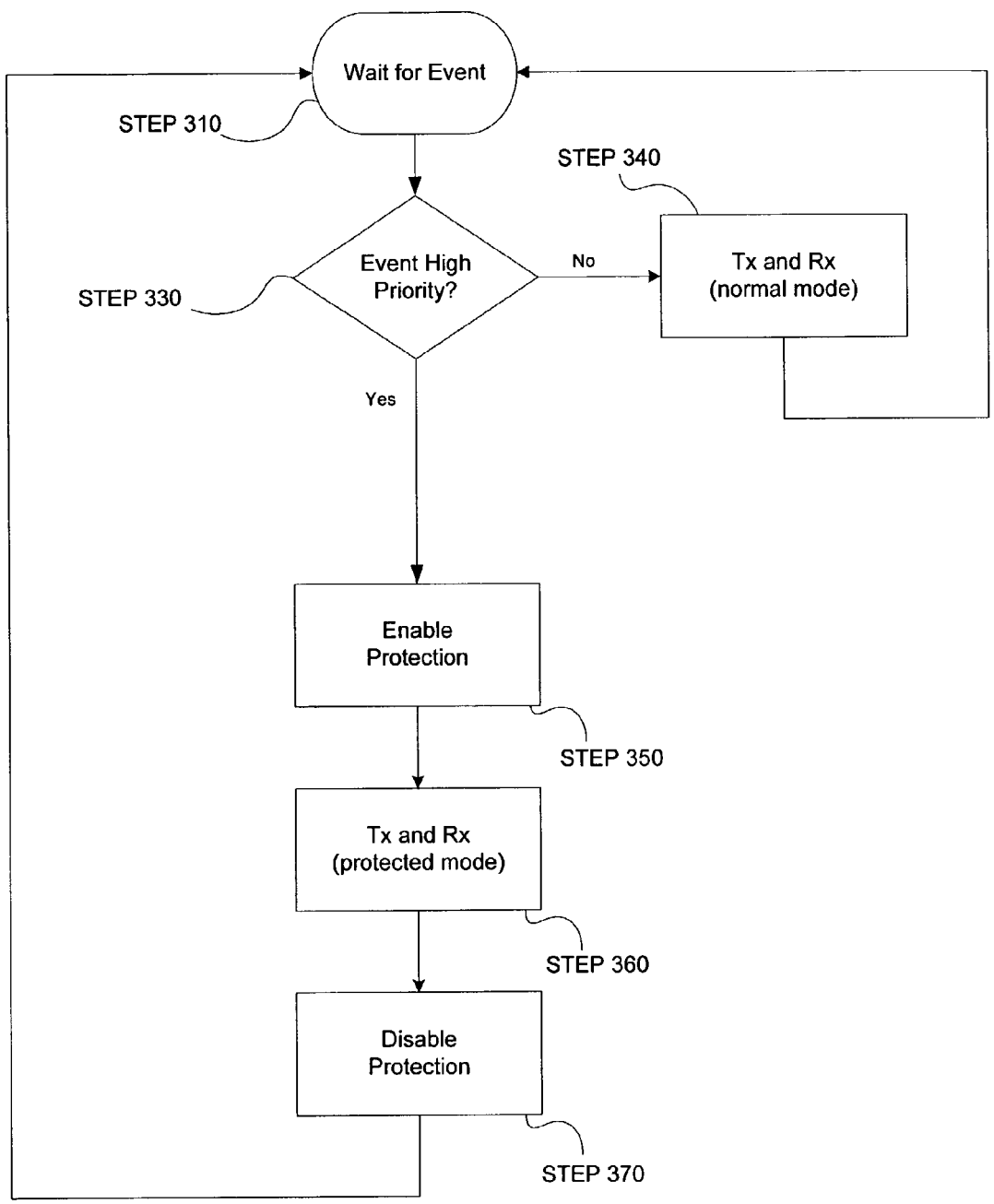
FIG. 3 is a flowchart of a first embodiment of the inventive dual-mode radio method.

FIG. 3 is a flowchart of a first dual-mode radio method in accordance with the present invention. As shown in FIG. 3, the first DMR method 300 begins at a STEP 310 whereat the method 300 waits for the occurrence of a Bluetooth™ event. When a Bluetooth™ event is detected, the method 300 proceeds to a decision STEP 330 whereat the method 300 determines whether the event is a high-priority event. In the basic DMR method, high-priority Bluetooth™ events are short in duration and/or have low duty cycles. An exemplary list of high-priority Bluetooth™ events is defined above and shown in table 1. All Bluetooth™ events that are not high priority are, by definition, low priority events.

If the method 300 determines that the event is a high-priority event, the method 300 proceeds to a STEP 350 whereat the method 300 enables protection (i.e., 802.11 transmissions are disabled). If the method determines that the event is not a high priority event, the method proceeds to a STEP 340 whereat the method 300 transmits and receives without modification (i.e., the radio operates in a normal mode and does not disable 802.11 transmissions). After the STEP 340, the method 300 returns to the STEP 310 to wait for another event.

After the STEP 350, the method proceeds to a STEP 360 whereat the method transmits and receives with "enable protection" (i.e., transmits and receives in a protected mode, which disables 802.11 transmissions). After the STEP 360, the method proceeds to a STEP 370 and disables protection (i.e., the method then allows 802.11 transmissions). After the STEP 370, the method returns to the STEP 310 to await another event.

The basic DMR method limits the throughput of the Bluetooth™ device when Bluetooth™ events are low priority and the 802.11 device is active (i.e., not in the 802.11 idle state).

The low-priority Bluetooth™ events receive capacity (i.e., transmit and receive time allocations) only when the 802.11 device is in the 802.11 idle state (except for possibly one packet every N ms (N approximately equal to 125), when the Bluetooth™ events are permitted to receive access to "keep-alive" events over a specific physical link to main robustness of the network). To facilitate a better understanding of the basic DMR method, exemplary scenarios are now described.

In a first exemplary scenario, both the Bluetooth™ and 802.11 protocols have equal user data rates over the two links. Consider an example where a personal digital assistant (PDA) is synchronized to a network-based server via a Bluetooth™ connection to a laptop computer and then over an 802.11 connection to a LAN. If the 802.11 radio has full use of the radio channel (i.e., there is no Bluetooth™ activity or any other interference on the radio channel), it can operate at a user rate of approximately 4 Mbps. If the Bluetooth™ radio has full use of the radio channel, it can operate at an asymmetrical user rate of approximately 700 kbps.

If both the Bluetooth™ and 802.11 protocols operate using an alternating use of the radio channel with efficient switching (i.e., if operating under a best case scenario of sharing the radio channel), the optimal sharing of the "air time" is approximately 15% allocated for 802.11 transmissions and 85% allocated for Bluetooth™ transmissions. In this case, the net data rate for each protocol is approximately 600 kbps. Thus, a realistic upper bound for the fraction of real time allocated for Bluetooth™ transmissions is approximately 80%.

In a second exemplary scenario, the basic DMR method is described in relation to an 802.11 device that is idle except for beacon monitoring. In the basic DMR method, low-priority Bluetooth™ events are allocated almost zero bandwidth when the 802.11 device is active (i.e., when it is not in an idle state). However, when the 802.11 is idle, the Bluetooth™ protocol uses as much bandwidth as possible to process low-priority Bluetooth™ events. Thus, the overall bandwidth allocated to the low-priority Bluetooth™ events equals the percentage of time that the 802.11 device is idle. However, this bandwidth allocation may be unacceptable because Bluetooth™ transmissions can be completely halted when the 802.11 device transmits or receives large files. Under typical operating conditions, Bluetooth™ transmissions receive less than approximately 20 kbps when the 802.11 device transmits or receives large files, which may or may not be acceptable to the user. A second DMR method (i.e., an enhanced DMR method) increases the throughput of low-priority Bluetooth™ events when the 802.11 is active. The second or enhanced DMR method is now described with reference to FIG. 4.

The second DMR method (or the enhanced DMR method) builds on the basic DMR method described above with reference to FIG. 3. The enhanced DMR method uses a simple augmentation to the basic method that "guarantees" the Bluetooth™ protocol some amount of bandwidth at all times (i.e., regardless of whether the 802.11 radio is active). The enhanced DMR method uses three priority level events, whereas the basic DMR method uses only two priority level events. In both the enhanced and basic DMR methods, the high and low priority level events are defined similarly. The three priority level events used by the enhanced DMR method are defined as follows:

1. Low Priority (LP) Events: non-time critical Bluetooth™ events. LP events do not cause preemption of the 802.11 radio. LP events typically are allocated bandwidth only when the 802.11 device is idle. LP events can also be allocated bandwidth when events are triggered by other requirements (e.g., when the Bluetooth™ device is going to poll at an 8 times/sec rate for power control).
2. Promotable Priority (PP) Events: non-time critical Bluetooth™ events that may be promoted to high-priority event status. Promotion to high priority level event status is determined by a specified parameter (e.g., a QoS parameter). A PP event preempts the 802.11 device when it is not idle.
3. High Priority (HP) Event: time critical Bluetooth™ events with typically short time durations. For example, "sniff", "park", "LMP" sequences, power control polls and "keep-alive" messages to slave devices. HP events take priority over 802.11 events. As described below, the enhanced DMR method interrupts the 802.11 device to ensure servicing of HP events.

Figure 4:
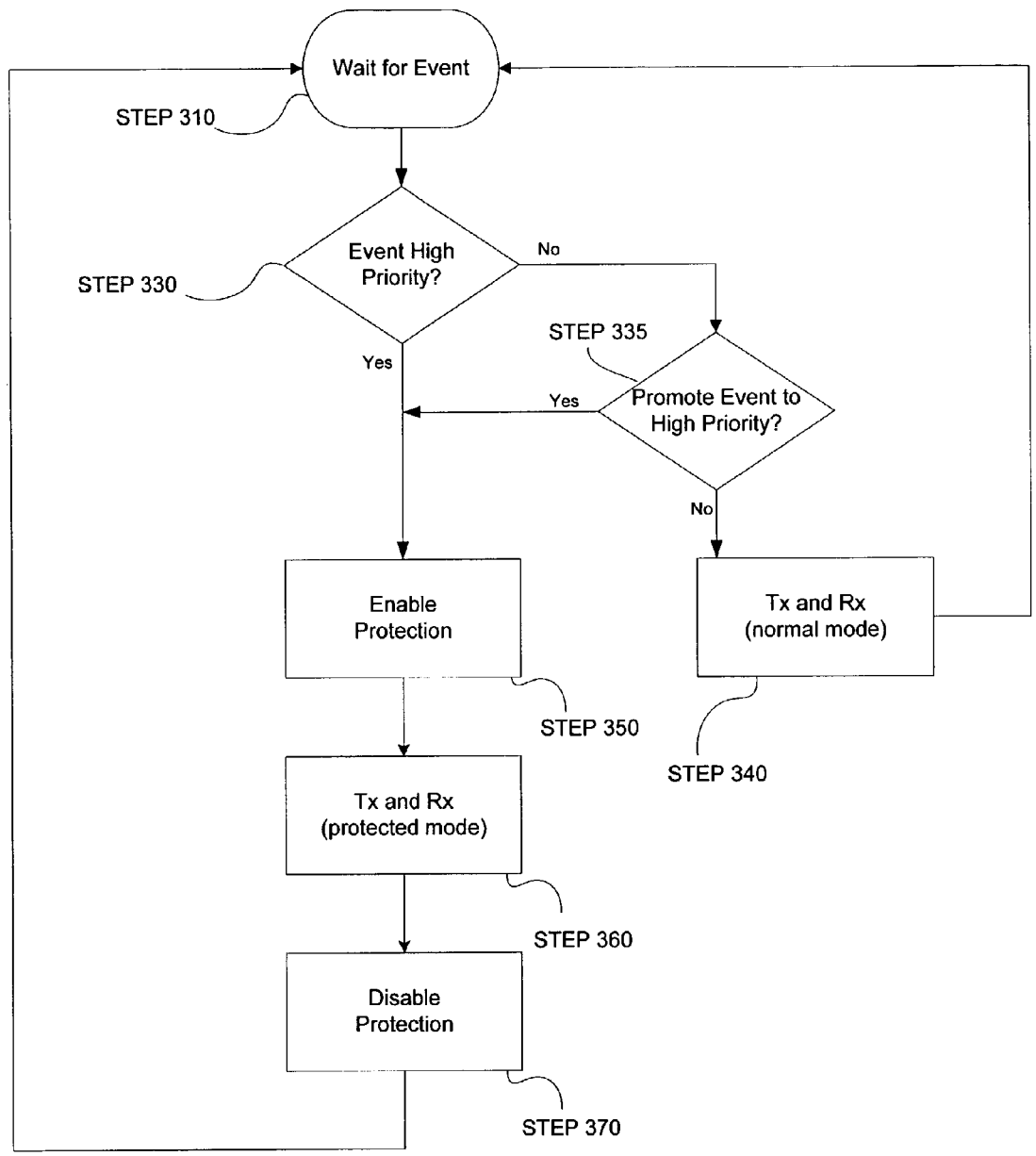
FIG. 4 is a flowchart of an enhanced dual-mode radio method in accordance with the present invention.

FIG. 4 is a flowchart of the enhanced DMR method. The enhanced method assigns one of three priorities to Bluetooth™ protocol events: high, low and promotable. These priority assignments can be predetermined or dynamically selected during radio operation. The enhanced DMR method of FIG. 4 is similar to the basic DMR method of FIG. 3, and thus, identical STEPS are not described in detail herein.

As shown in FIG. 4, the enhanced DMR method 400 begins at a STEP 310 whereat the method waits for the occurrence of a Bluetooth™ event. When a Bluetooth™ event is detected, the method proceeds to a decision STEP 330 whereat the method determines whether the Bluetooth™ event is a high-priority event. If the method determines that the Bluetooth™ event is a high-priority event, the method 400 proceeds to a STEP 350 whereat the method enables protection (i.e., the method disables 802.11 transmissions). If the method determines that the Bluetooth™ event is not a high-priority event at the STEP 330, the method proceeds to a decision STEP 335.

After enabling protection at the STEP 350, the method proceeds to a STEP 360 whereat the method transmits and receives with protection enabled. After the STEP 360, the method then proceeds to a STEP 370 whereat the method disables protection. After the STEP 370, the method returns to the STEP 310 to await the occurrence of the next event.

At the decision STEP 335, the method determines whether the Bluetooth™ event should be promoted from a low-priority event to a high priority event. An exemplary method of determining whether to promote a low-priority event to a high-priority event is described below with reference to the QoS DMR method. If the method determines that the low-priority Bluetooth™ event should be promoted to a high-priority event, the method proceeds to the above-described STEP 350 and transmits with protection enabled. Otherwise, the method proceeds to a STEP 340 whereat the method transmits and receives in a normal mode. After the STEP 340, the method returns to the STEP 310 to await another event. The enhanced DMR method controls 802.11 transmissions to improve system capacity of both 802.11 and Bluetooth™ communications protocols in a DMR radio.

The enhanced DMR method is considered to be a "bandwidth on demand" method because some bandwidth is guaranteed to be allocated to the Bluetooth™ device regardless of the activity of the 802.11 device (i.e., whether or not the 802.11 device is operating in a power savings mode). When bandwidth is not required by the Bluetooth™ device it does not preempt the 802.11. In one embodiment referred to herein as the "QoS DMR method", the bandwidth on demand uses quality of service (QoS) parameters such as service type, token rate and latency, to allocate bandwidth in the DMR apparatus. The QoS DMR method is now described with reference to FIG. 5.

The QoS DMR method uses QoS parameters to determine whether to promote a promotable priority event to a high-priority event (see, for example, STEP 335 of FIG. 4). In one embodiment, the QoS DMR method uses parameters provided by the logical link control and adaptation protocol (L2CAP). The L2CAP is a Bluetooth™ protocol that receives data from higher protocol layers and applications and transmits the date over the lower layers. L2CAP passes packets either to the host controller interface (HCI), or in a host-less system, directly to the link manager (LM).

As described in the above-incorporated Bluetooth™ specification, the L2CAP accepts QoS parameters. The QoS parameters can be established in order to request desired service characteristics. The QoS parameters are exchanged between the L2CAP levels of master and slave devices, and thus, a master device can attempt to achieve a desired service request by scheduling events. The L2CAP can transmit QoS parameters to the LM using an HCI message. The following list is an exemplary list of QoS parameters that the QoS DMR method can use to determine whether to promote a low-priority event to a high-priority event:

Exemplary List of QoS Parameters:
1. Service_Type: indicates if the connection should be treated as "Best Effort" or "Guaranteed".
2. Token_Rate: the desired data rate (in bytes/sec).
3. Latency: effectively the maximum delay from when an application delivers a packet of data to L2CAP and when it is transmitted over the air link (in microseconds).

The QoS parameters are transferred from L2CAP to the LM. The LM communicates the polling rate (Tpoll) over the air link in the LMP_quality_of_service PDU in a well-known manner. The slave device can request a "Tpoll" value. The master device informs the slave device of the Tpoll that will be used by the master device to determine a minimum polling rate. Three exemplary embodiments of the QoS DMR method are now described.

A first exemplary embodiment of the QoS DMR method is also referred to herein as the "simple capacity allocation (SCA)" method. The SCA method uses three QoS parameters, "Service_Type", "Token_Rate" and "Latency", to guarantee that bandwidth is allocated to a Bluetooth™ device. The SCA method uses the Service_Type parameter to identify Bluetooth™ connections that should be assigned promotable Bluetooth™ priority. The SCA method assigns higher priority to Bluetooth™ connections for which "Guaranteed" service is requested. The SCA method attempts to provide the requested service even if the 802.11 transmissions must be pre-empted. The SCA method is now described with reference to FIG. 5.

Figure 5:
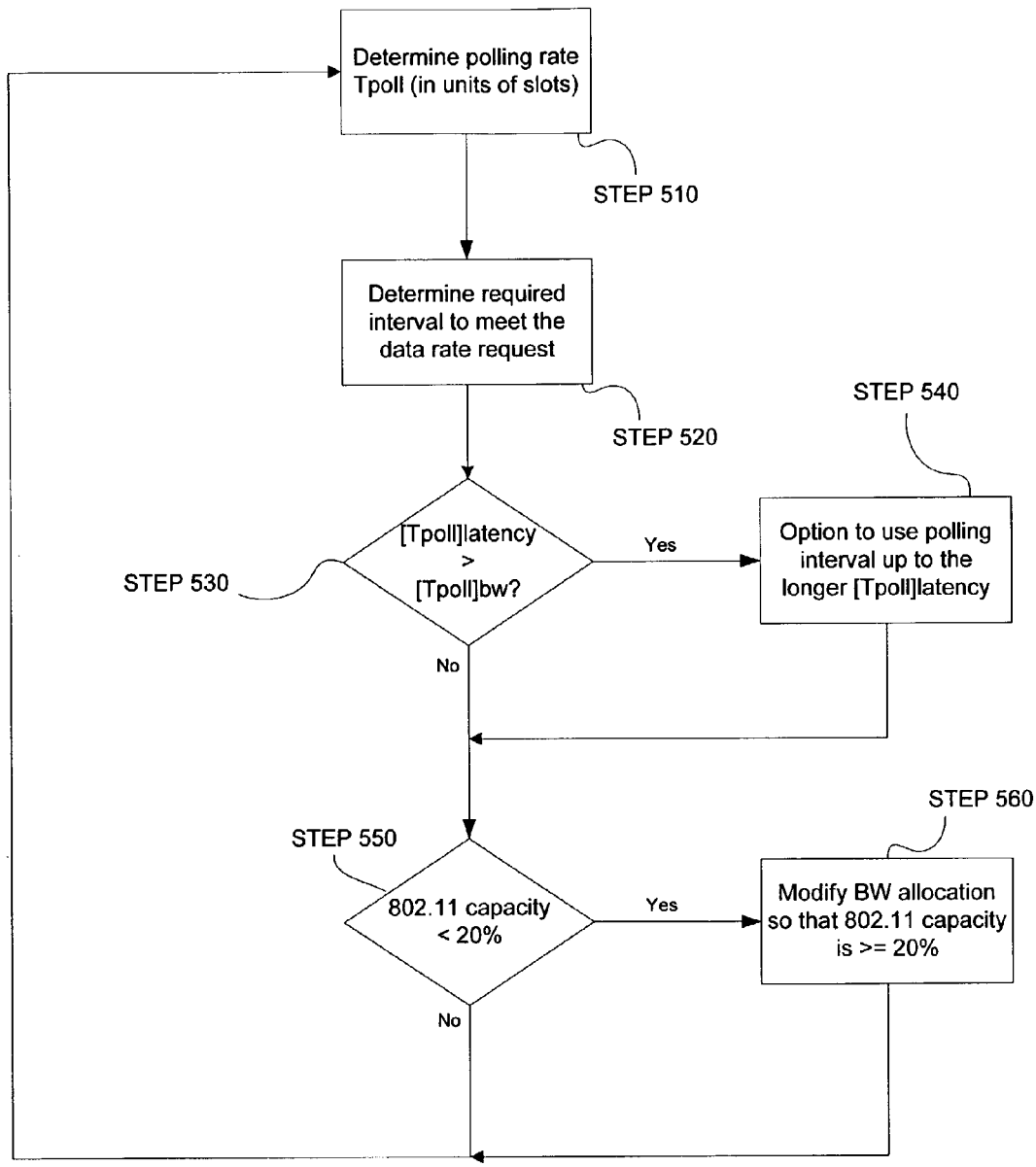
FIG. 5 is a first exemplary embodiment of the inventive QoS dual-mode radio method.

FIG. 5 is a first exemplary embodiment of the QoS DMR method in accordance with the present invention. As shown in FIG. 5, the SCA method 500 begins at a STEP 510 whereat the method determines a polling rate ("Tpoll") in units of slots. In one embodiment, the method uses the "Latency" parameter to get a "Tpoll" value by converting the latency value (in microseconds) into a Tpoll value (in units of slots) using the following conversion equation:

$[Tpoll]_{Latency}$ (in units of slots)=Latency/625

After the STEP 510, the SCA method proceeds to a STEP 520.

At the STEP 520, the SCA method 500 determines a required minimum packet rate value ($[Tpoll]_{used}$). The inventive SCA method determines the required minimum packet rate because allowing one packet for each Tpoll interval may not meet the requested capacity requirements. In one embodiment, the SCA method determines the required minimum packet rate by selecting either the $[Tpoll]_{Latency}$ or the $[Tpoll]_{BW}$ (i.e., a Tpoll value that is based on the requested data rate (i.e., Token_Rate)). The SCA method determines the required minimum packet rate ($[Tpoll]_{used}$) by assuming that DH5 packets can be used (sufficiently low packet error rate) over the air link. In Bluetooth™, DH5 packets are the highest bandwidth packet available containing 339 bytes of information. When transmitted every 3.75 ms the unidirectional data rate for DH5 packets is 723.2 kbps. With one DH5 packet every Tpoll period, the required interval to meet the data rate request can be determined in accordance with the following equation:

$[Tpoll]_{BW}$ in slots = (339/0.625) * 1000/(Token Rate in bytes/sec)

= 542400/(Token Rate).

The SCA method determines the required minimum packet rate by selecting the minimum of these two values as shown in the following equation:

$[Tpoll]_{used} = MIN([Tpoll]_{latency}, [Tpoll]_{BW})$

This interval would meet both the latency and the bandwidth requirements assuming that one DH5 packet can be delivered without error every polling time. A potential problem in the DMR device is that the time windows that this interval leaves for the 802.11 device controller may be inadequate. If the Bluetooth™ protocol carries one packet pair each poll event this consumes 6 or 10 slots, depending on whether the packet pair is a 5 slot plus 1 slot ACK, or it is a 5 slot plus 5 slot, for symmetrical data flows. Thus, as the value of Tpoll decreases, the time available for the 802.11 transmissions (Tpoll minus 10 slots) may be too short to be effective. Adding to the complexity is the fact that the packet sizes for 802.11 transmissions can vary from well under a millisecond to more than 10 milliseconds. If both directions of the 802.11 communications protocol are communicating data packets (rather than one communication comprising a simple "acknowledge" (ACK) transmission), the 802.11 protocol can require as much as 20+ milliseconds to carry out a single packet pair. Thus, as Tpoll approaches 40 slots (the recommended default in Bluetooth™) this can become a critical issue. After the STEP 520, the SCA method proceeds to a decision STEP 530.

At the decision STEP 530, the SCA method determines whether the poll period required by the QoS latency constraint (i.e., the $[Tpoll]_{Latency}$) is greater than the poll period required by the bandwidth constraint (i.e., the $[Tpoll]_{BW}$). If so, the SCA method proceeds to a STEP 540, else, the SCA method proceeds to a decision STEP 550. At the STEP 540, the SCA method 500 has the option of using a polling interval that has a duration up to the longer $[Tpoll]_{Latency}$ value. The method also can carry more than one packet at each Tpoll time event. After the STEP 540, the SCA method 500 proceeds to the decision STEP 550.

At the decision STEP 550, the SCA method determines whether the partitioning of the bandwidth allocation between the Bluetooth™ and 802.11 protocols violates the recommended 20/80 bandwidth allocation split described above. In one embodiment, the SCA method determines at STEP 550 whether the 802.11 bandwidth capacity is less than 20%. If so, the method proceeds to a STEP 560, else the method returns to the STEP 510 to determine the polling rate Tpoll as described above.

At the STEP 560, the inventive method modifies the bandwidth allocation so that the 802.11 bandwidth capacity is greater than or equal to 20%. In one embodiment, the Tpoll and/or number of packets per poll event are modified to achieve the required 802.11 bandwidth capacity. This modification can occur even when the Bluetooth™ bandwidth capacity exceeds 80%. For example, when the 802.11 protocol device is idle, the Bluetooth™ protocol can temporarily increase to a higher capacity. However, in typical operating conditions, Bluetooth™ bandwidth capacity will not increase to more than approximately 95% when the 802.11 is monitoring an access point for beacon transmissions because the 802.11 beacon monitoring requires allocation of at least one or two milliseconds every 100 milliseconds.

In another embodiment of the present inventive method, under conditions where latency is not a concern for the Bluetooth™ protocol, the method 500 allows the 802.11 protocol to transmit packets over the airlink using longer blocks of time. In this embodiment, the "Tpoll" bandwidth parameter is expressed as a percentage of slots. The Bluetooth™ packets are gathered together to increase the airlink time for the 802.11 protocol transmissions. Thus, under the conditions wherein DH5 packets are transmitted in one direction, and one slot packets (e.g., DM1, DH1 and NULL) are transmitted in a reverse direction, the Tpoll bandwidth, expressed as a percentage of slots, can be determined as shown in the following equation:

$$[Tpoll]_{BW\%} = 6/[Tpoll]_{BW}$$

A second exemplary embodiment of the QoS DMR method is also referred to herein as the "Accounting of Delivered Data" (ADD) method. The ADD method takes account of delivered data and adjusts the Bluetooth™ protocol bandwidth allocations and the polling interval to maintain a desired throughput of connections having a "Guaranteed" service_type. In one embodiment of the ADD method, the total delivered data is monitored based on acknowledgement signals (ACKs). The Bluetooth™ master device shifts to other slaves, or to the 802.11 activity, only when the requested data rate (Token Rate) is met at each poll event.

A third exemplary embodiment of the QoS DMR method is also referred to herein as the "Best Effort" (BE) method. Bluetooth™ connections having a "Best Effort" service_type will receive poor service when the 802.11 protocol is busy. The baseline capacity for any device is the poll rate for power control and link maintenance of approximately 8 times/sec. This results in a data rate that is less than or equal to 22 kbps. The BE method ensures a higher minimum rate by utilizing the Latency parameter of the Bluetooth™ QoS interface to set a Tpoll that is less than the 200 slots (imposed by the power control function). Combined with a "max_slots" value, the link can be limited to a certain data rate and the capacity impact on the 802.11 communications protocol will be known. For example, if the Tpoll value for such a device is as small as the default value of 40 slots and DH5 packets are used, the data rate can be as high as 108 kbps. Under these conditions, the 802.11 radio is allocated approximately 85% of the real-time link and is segmented into 21 msec spans. This has a significant impact on the resulting 802.11 bandwidth capacity.

Exemplary Software Implementations of the DMR Method

In one embodiment, the above-described DMR method is implemented in software. The exemplary software implementations can be used as an optional feature of a protocol stack. In one embodiment, the exemplary software implementations are enabled through a separate build of code. In another embodiment, the exemplary software implementations are enabled through configuration parameters stored in non-volatile memory (e.g., EEPROM or Flash memory), where the protocol stack defaults to disable the exemplary software implementations. In addition, when the 802.11 communication protocol is inactive, the Bluetooth™ communications protocol functions normally. In one embodiment, the exemplary software implementations are enabled and disabled using an HCI command (using either a vendor specific or standard, unused HCI command).

The first exemplary software implementation of the present DMR method provides a mechanism for the basic and enhanced DMR methods to enable protection for Bluetooth™ transmission and receptions. The first exemplary software implementation determines 802.11 protocol status (e.g., the mode of operation) and controls the Bluetooth™ activity. The first exemplary software implementation disables 802.11 transmissions whenever the Bluetooth™ protocol is transmitting and during high priority receptions.

In one embodiment, the first exemplary software implementation uses the BT_ACTIVE output to disable the 802.11 TX enable signal that is internal to the 802.11 reference design (see, e.g., FIG. 1 above). The BT_ACTIVE is an active high signal. The first exemplary software implementation which is used to control the BT_ACTIVE output in master and slave devices is now described with reference to FIGS. 6 and 7. The software implementation in a master device is described with reference to FIG. 6. The software implementation in a slave device is described with reference to FIG. 7.

Figure 6:
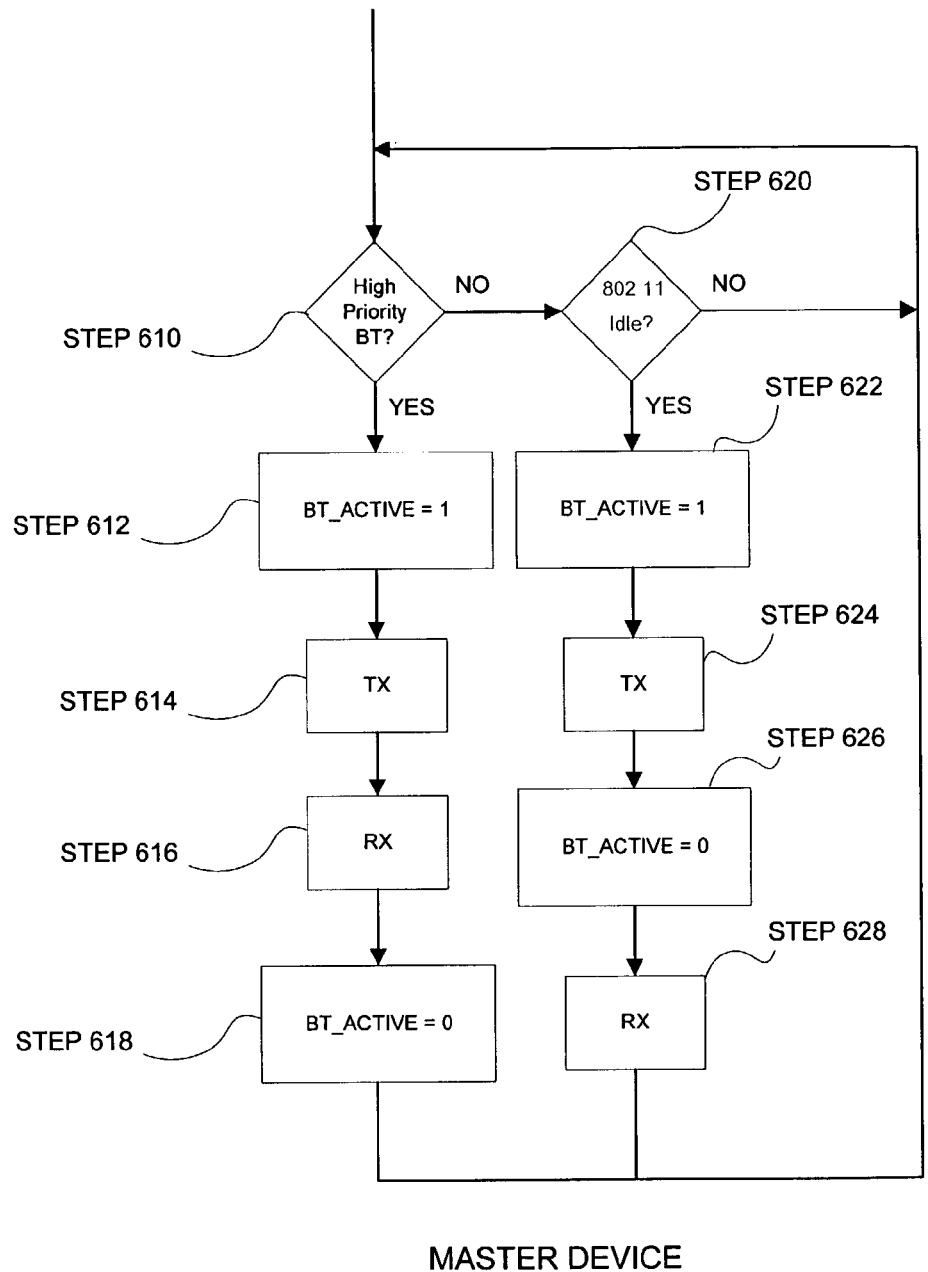
FIG. 6 is a flowchart of a first exemplary software implementation of the dual-mode radio method for use in a master device.

FIG. 6 is a flowchart of the first exemplary software implementation of the DMR method for use in a master device. As shown in FIG. 6, the first exemplary software implementation 600 begins at a decision STEP 610 whereat the method determines whether the event is a high-priority Bluetooth™ event. If so, the method proceeds to a STEP 612, else, the method 600 proceeds to a decision STEP 620.

At the STEP 612 the method sets the BT_ACTIVE GPIO output to a logical high value (i.e., "active"), which disables 802.11 transmissions in the manner described above. After the STEP 612, the method proceeds to a STEP 614 whereat Bluetooth™ transmissions are allowed. After the STEP 614, the method proceeds to a STEP 616 whereat the Bluetooth™ radio receives data. Thus, the Bluetooth™ protocol transmissions and receptions are protected from interruption by the 802.11 transmissions. After the STEP 616, the method proceeds to a STEP 618 whereat the method 600 sets the BT_ACTIVE GPIO output to a logical low value (i.e., "inactive"), which enables 802.11 transmissions in the manner described above. After the STEP 618, the method returns to the decision STEP 610 to determine if the event is a high priority event.

At the STEP 620, the method determines whether the 802.11 device is operating in an idle mode. If so, the method proceeds to a STEP 622, else, the method 600 returns to the decision STEP 610. At the STEP 622, the method sets the BT_ACTIVE GPIO output to high or a logical one (i.e., active), which disables 802.11 transmissions. After the STEP 622, the method proceeds to a STEP 624 whereat the Bluetooth™ radio transmits data. After the STEP 624, the method proceeds to a STEP 626 whereat the method sets the BT_ACTIVE GPIO output to a low or a logical zero value (i.e., inactive), which enables 802.11 transmissions. After the STEP 626, the method proceeds to a STEP 628 whereat the Bluetooth™ radio receives data. Thus, the Bluetooth™ protocol transmissions are protected from interruption (BT_ACTIVE=1), whereas the Bluetooth™ protocol receptions are unprotected (BT_ACTIVE=0). After the STEP 628, the method 600 returns to the decision STEP 610.

Figure 7:
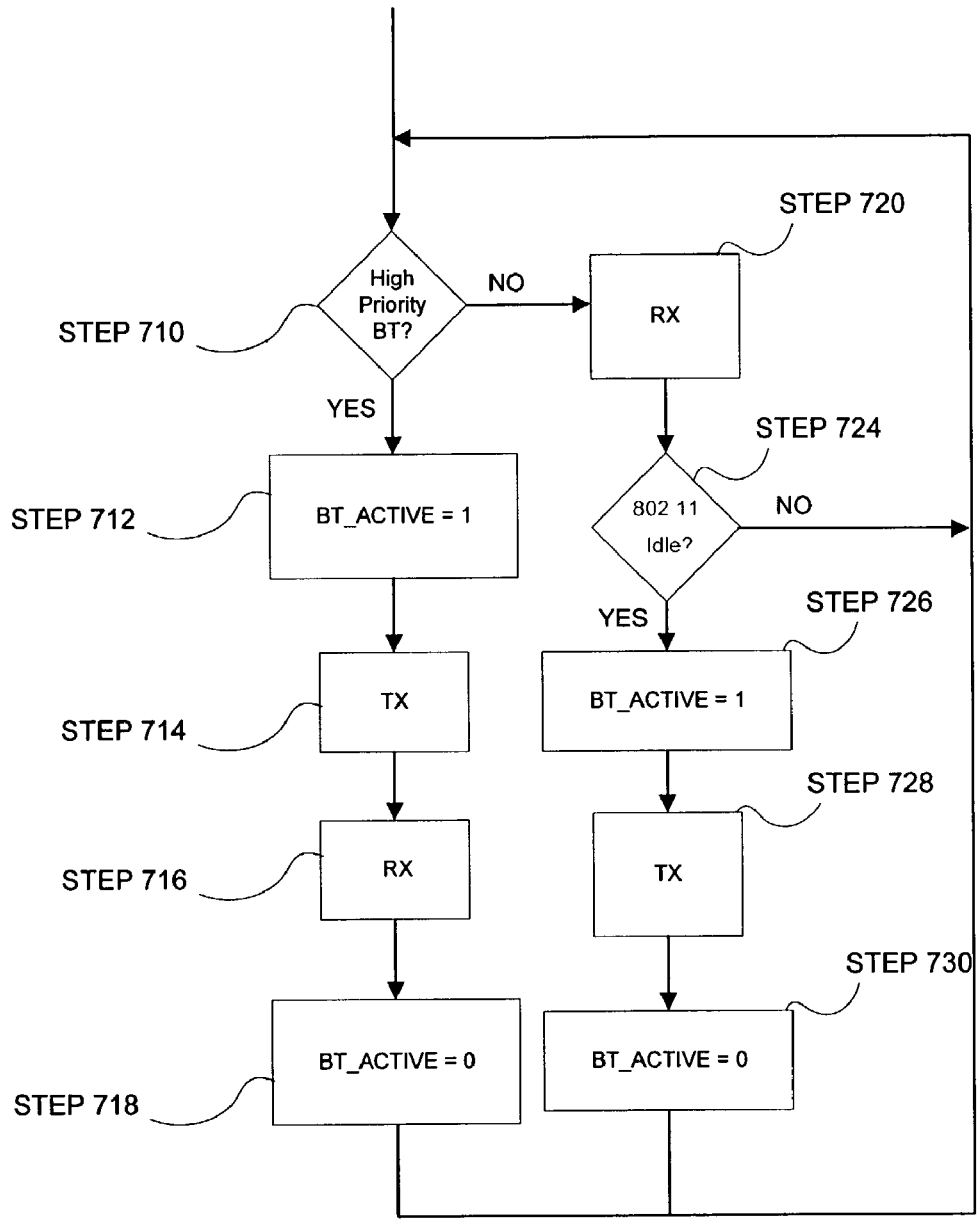
FIG. 7 is a flowchart of the first exemplary software implementation of the dual-mode method for use in a slave device.

FIG. 7 is a flowchart of the first exemplary software implementation of the DMR method for use in a slave device. As shown in FIG. 7, similar to the implementation in the master device (FIG. 6) the first exemplary software implementation method 600' begins at a decision STEP 710 whereat the method 600' determines whether the Bluetooth™ event is a high-priority Bluetooth™ event. If so, the method proceeds to a STEP 712, else, the method proceeds to a STEP 720.

At the STEP 712, the method sets the BT_ACTIVE to a logical high value (i.e., "active"), which disables the 802.11 transmissions. After the STEP 712, the method proceeds to a STEP 714 whereat the Bluetooth™ transmissions are allowed. After the STEP 714, the method proceeds to a STEP 716 whereat the Bluetooth™ radio receives data. Thus, the Bluetooth™ protocol transmissions and receptions are protected from interruption by the 802.11 transmission. After the STEP 716, the method proceeds to a STEP 718 whereat the method 600 sets the BT_ACTIVE signal to a logical low value (i.e., "inactive"), which enables 802.11 transmissions. After the STEP 718, the method returns to the decision STEP 710 to determine if the event is a high priority event.

At the STEP 720 the Bluctooth™ radio receives data. After the STEP 720, the method proceeds to a decision STEP 724 whereat the method determines whether the 802.11 device is idle. If so, the method proceeds to a STEP 726, else, the method returns to the decision STEP 710. At the STEP 726, the method 600 sets the BT_ACTIVE signal to a high or a logical one (i.e., "active"), which disables 802.11 transmissions. At the STEP 728 Bluetooth™ transmissions are permitted. After the STEP 728, the method proceeds to a STEP 730 whereat the method 600 sets the BT_ACTIVE signal to low or a logical zero (i.e., "inactive"), which enables 802.11 transmissions. Thus, the Bluetooth™ protocol receptions are unprotected from 802.11 interruption, whereas the Bluetooth™ protocol transmissions are protected. After the STEP 730, the method 600 returns to the decision STEP 710.

In summary, the first exemplary software implementation of the present DMR method determines whether Bluetooth™ events are high priority and whether the 802.11 radio is transmitting. The method sets the BT_ACTIVE signal to either a high or low value depending upon the aforementioned determinations and the Bluetooth™ frame structure. In addition, the method does not restore transmit capability to the 802.11 communications protocol until the Bluetooth™ radio finishes transmission attempts.

The second exemplary software implementation of the present DMR method provides a mechanism for promoting promotable priority Bluetooth™ events to high-priority Bluetooth™ events. The method also provides a mechanism for enabling protection for Bluetooth™ transmission and receptions. The second exemplary software implementation of the inventive DMR method determines 802.11 protocol status (e.g., the 802.11 mode of operation) and controls Bluetooth™ activity. The second exemplary software implementation disables 802.11 transmissions whenever the Bluetooth™ device is transmitting. 802.11 transmissions are also disabled whenever the Bluetooth™ radio is receiving high priority data.

In one embodiment of the second exemplary software implementation, a counter is used to determine when to promote promotable Bluetooth™ events. In one embodiment, the counter is initiated in Bluetooth™ firmware when the 802.11 device is active (i.e., not operating in idle state). The counter, referred to herein as "count", counts the number of timeslots (e.g. 625 us) while the 802.11 is active subject to the following rules:

1. The counter, count, is active while the 802.11 device is active.
2. The units of count are timeslots.
3. When 802.11 is idle the counter remains at zero.
4. When count reaches a predefined maximum value, MAX, the counter is reset to zero.

When the Bluetooth™ device, operating as master or slave device, has no transmissions, it immediately sets count to zero, thereby allowing the 802.11 protocol to gain access to the channel.

The second exemplary software implementation of the present DMR method promotes promotable Bluetooth™ priority events to high priority Bluetooth™ events in accordance with the following rules:

1. While count is less than a threshold "thresh" low priority Bluetooth™ events are prohibited.
2. While count is greater than thresh, low priority events are treated as if they were high priority events, until count reaches a maximum value, "MAX".

In one embodiment, the values for "MAX" and "thresh" are virtually static and defined hereinbelow with reference to TABLE 2. These values are likely to differ from those shown in TABLE 2 depending on whether the device is a master or slave. They may also be different from those shown depending on the required quality of service. Thus, latency is determined by the maximum amount of time that the 802.11 device can be off the air without producing detrimental effects. The second exemplary software implementation of the DMR method ensures that the 802.11 protocol is able to receive at least 1 out of every 3 beacons. Therefore, a time window of approximately 110 ms (102.4 ms required for the beacon interval and 1 ms required for the length of the beacon, with some flexibility), or 176 slots, should be available every 307.2 ms (three beacon intervals). The closest integer number of slots to 307.2 ms is 492 slots, or 307.5 ms. Thus, the Bluetooth™ communications protocol is allocated 64.2% of the channel, while the 802.11 protocol is allocated 35.8%. This channel allocation is exemplary only and different bandwidth allocation ratios may be used without departing from the scope or spirit of the present invention.

TABLE 2

| Value | Master Mode | Slave Mode |
| --- | --- | --- |
| MAX | 492 | 492 |
| Thresh | 176 | 176 |

Figure 8:
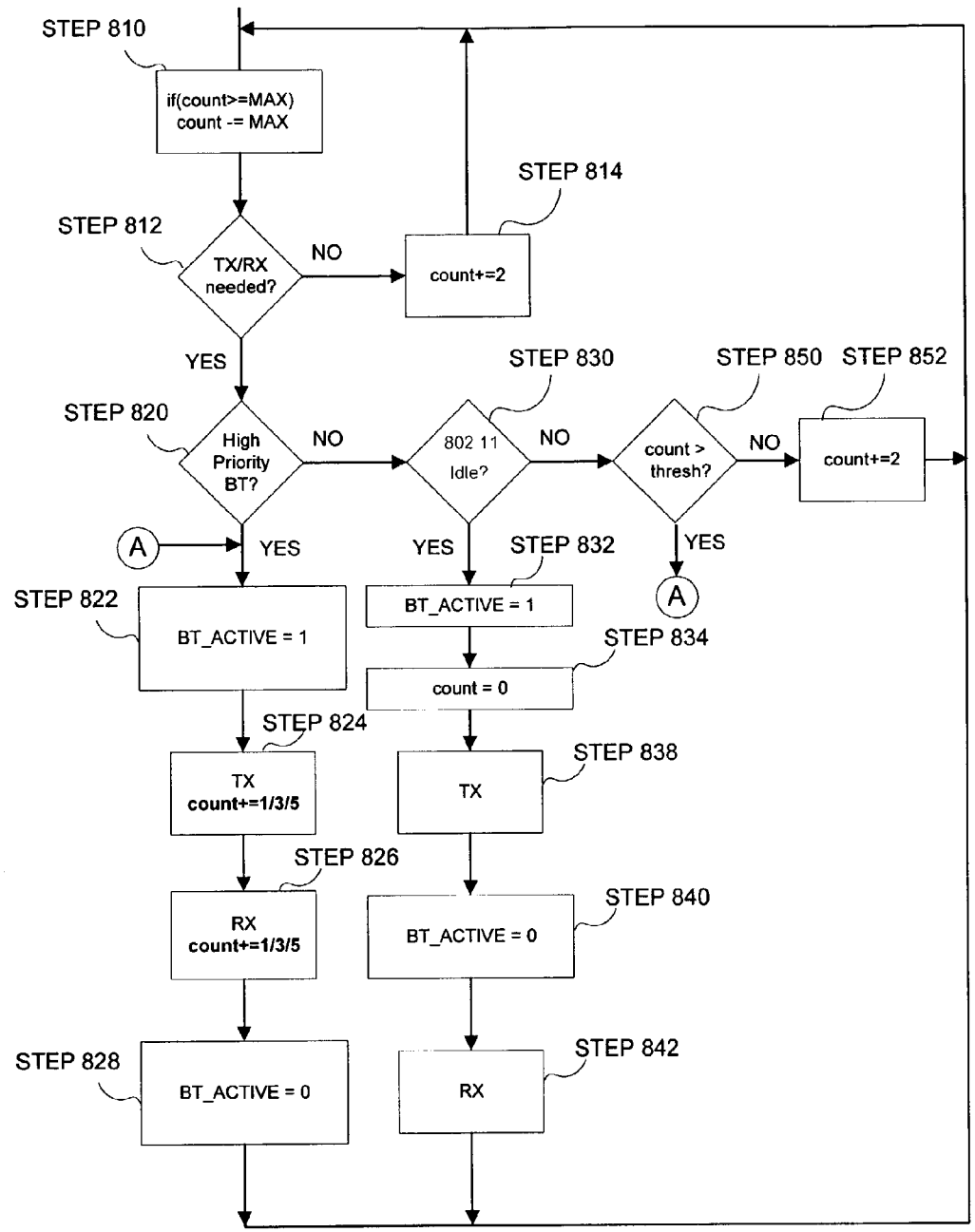
FIG. 8 is a flowchart of a second exemplary software implementation of the dual-mode radio method for use in a master device.
Figure 9:
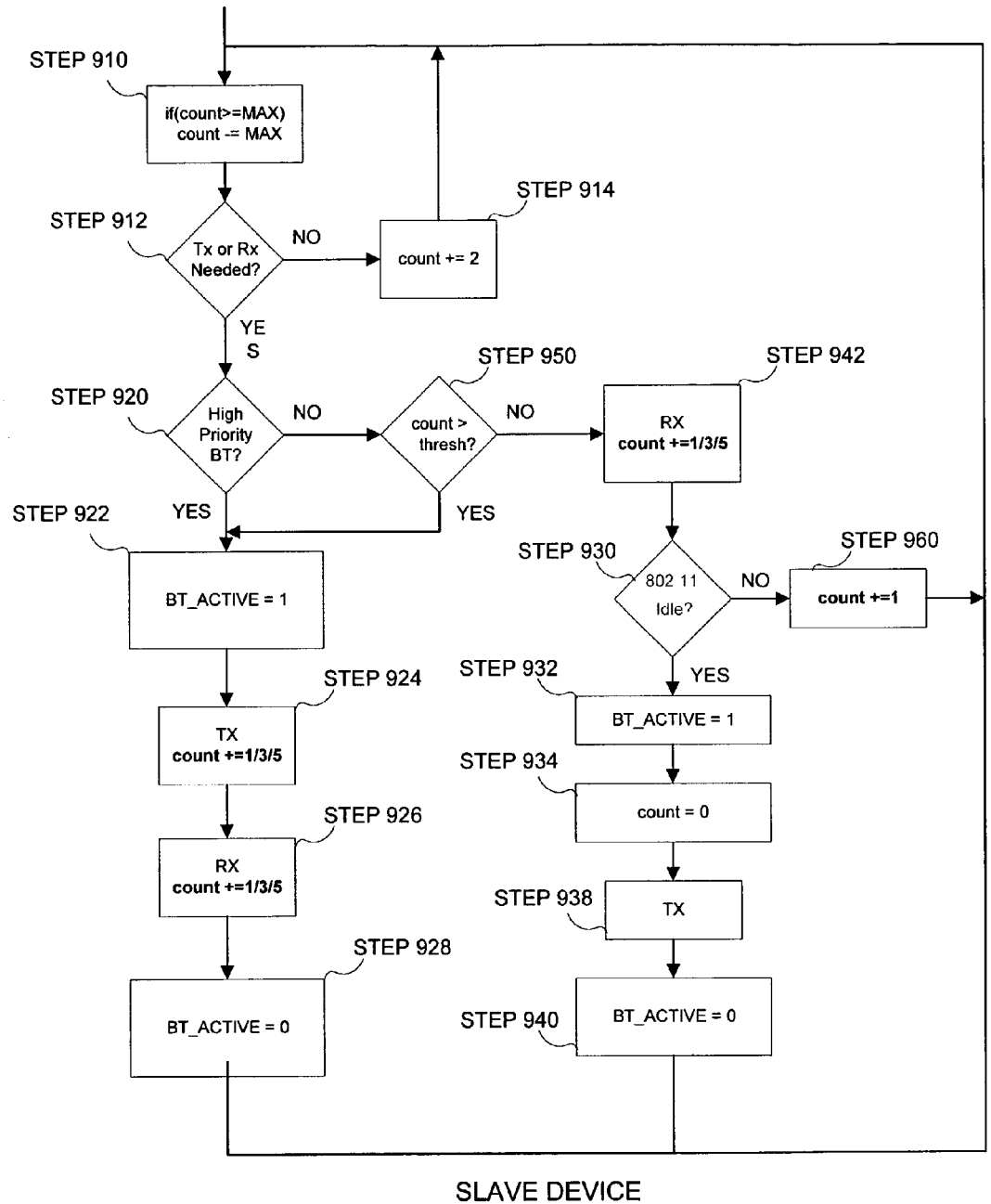
FIG. 9 is a flowchart of the second exemplary software implementation of the dual-mode method for use in a slave device.

In another embodiment, the values for MAX and thresh are based on the HCI_QoS_Setup message parameters. A second exemplary software implementation of the present DMR method for controlling the BT_ACTIVE control signal in master and slave devices is now described with reference to FIGS. 8 and 9. FIG. 8 shows a flowchart of the second exemplary software implementation of the present DMR method for use in a master device. FIG. 9 shows a flowchart of the method for use in a slave device.

As shown in FIG. 8, the second exemplary software implementation of the DMR method begins at a STEP 810 whereat the method checks whether the counter value is larger than MAX. If the counter is large than MAX, MAX is subtracted from the current value of count.

After the STEP 810, the method proceeds to a decision STEP 812 whereat the method determines whether transmission or reception is required. If transmission or reception is not required the method proceeds to STEP 814 where the count is increased by 2 (e.g. two timeslots) to account for two timeslots during which the 802.11 device is allowed to access the channel. After the STEP 814, the method returns to the STEP 810. If transmission or reception is required at STEP 812, the method proceeds to STEP 820.

At the decision STEP 820, the method determines whether the Bluetooth™ event is a high-priority event. If so, the method proceeds to a STEP 822, else, the method proceeds to a decision STEP 830. At the STEP 822, the method sets the BT_ACTIVE control signal to logical high or "one" value (i.e., active), which disables 802.11 transmissions. After the STEP 822, the method proceeds to a STEP 824 whereat the Bluetooth™ device transmits data. The counter is increased by 1, 3, or 5 depending on the length of the packet transmitted. After the STEP 824, the method proceeds to a STEP 826 whereat the Bluetooth™ device receives data. The counter is increased by 1, 3, or 5 depending on the length of the packet received. Thus, the Bluetooth™ transmissions and receptions are protected from interruption by 802.11 transmissions and the timeslots used for these transmissions and receptions are included in the count value. After the STEP 826, the method proceeds to a STEP 828 whereat the method resets the BT_ACTIVE control signal to a logical low or zero value (i.e., "inactive"), which enables 802.11 transmissions. After the STEP 828, the method returns to the decision STEP 810.

Referring again to FIG. 8, at the decision STEP 830, the method determines whether the 802.11 device is operating in an idle state. If so, the method proceeds to a STEP 832, else, the method proceeds to the decision STEP 850. At the STEP 832, the method sets the BT_ACTIVE signal to a logical high or a logical one value (i.e., active), which disables 802.11 transmissions. After the STEP 832, the method proceeds to a STEP 834 whereat the method resets the counter to zero. After the STEP 834, the method proceeds to a STEP 838 whereat the Bluetooth™ device transmits data. After the STEP 838, the method proceeds to a STEP 840 whereat the method sets the BT_ACTIVE signal to low (logical zero) (i.e., inactive), which enables 802.11 transmissions. After the STEP 840, the method proceeds to a STEP 842 whereat the Bluetooth™ device receives data. Thus, the Bluetooth™ protocol transmissions are protected from interruption by 802.11 transmissions, whereas the Bluetooth™ protocol receptions are left unprotected. After the STEP 842, the method returns to the decision STEP 810.

At the decision STEP 850, the method determines whether the counter is greater than a threshold value ("thresh"). If so, the method proceeds to the STEP 822, else, the method proceeds to a STEP 852. At the STEP 852, the method increments to account for two timeslots during which the 802.11 device is allowed access to the channel. After the STEP 852, the method returns to the STEP 810.

FIG. 9 is a flowchart of the second exemplary software implementation of the inventive DMR method for use in a slave device. As shown in FIG. 9, the second exemplary software implementation of the DMR method 800' begins at a STEP 910 whereat the method checks whether the counter value is larger than MAX. If the counter is greater than MAX, MAX is subtracted from the current value of count.

After the STEP 910, the method proceeds to a decision STEP 912 whereat the method determines whether transmission or receptions are required. If transmissions or receptions are not required, the method proceeds to STEP 914 whereat the count is increased by 2 (e.g. two timeslots) to account for two timeslots that the 802.11 device is allowed access to the channel. After the STEP 914, the method returns to the STEP 910. If transmission or reception is required at STEP 912, the method proceeds to decision STEP 920.

At the decision STEP 920, the method determines whether the Bluetooth™ event is a high-priority event. If so, the method proceeds to a STEP 922, else, the method proceeds to a decision STEP 950. At the STEP 922 the method sets the BT_ACTIVE control signal to a logical high value, or "one" (i.e., active), which disables 802.11 transmissions. After the STEP 922, the method proceeds to a STEP 924 whereat the Bluetooth™ protocol device transmits data. The counter is increased by 1, 3, or 5 depending on the length of the packet transmitted. After the STEP 924, the method proceeds to a STEP 926 whereat the Bluetooth™ protocol device receives data. The counter is increased by 1, 3, or 5 depending on the length of the packet received. Thus, the Bluetooth™ transmissions and receptions are protected from interruptions by 802.11 transmissions. After the STEP 926, the method proceeds to a STEP 928 whereat the method resets the BT_ACTIVE control signal to a logical low or zero value (i.e., inactive), which enables 802.11 transmissions. After the STEP 928, the method returns to the decision STEP 910.

At the decision STEP 950, the method determines whether the counter is greater than a threshold value ("thresh"). If so, the method proceeds to the STEP 922, else, the method proceeds to a STEP 942. At the STEP 942, the method allows the Bluetooth™ protocol device to receive data. The method also increases the counter by 1, 3, or 5 depending on the length of the received packet. After the STEP 942, the method proceeds to a decision STEP 930 whereat the method determines whether the 802.11 device is idle. If so, the method proceeds to a STEP 932, else, the method proceeds to a STEP 960. At the STEP 960, the method increments the counter by one to account for a timeslot of bandwidth that is allocated for 802.11 transmissions. After the STEP 960, the method returns to the STEP 910.

At the STEP 932, the method sets the BT_ACTIVE control signal to a logical high (or "one") value (i.e., active), which disables 802.11 transmissions. After the STEP 932, the method proceeds to a STEP 934 whereat the method resets the counter to zero. After the STEP 934, the method proceeds to a STEP 938 whereat the Bluetooth™ protocol device transmits data. After the STEP 938, the method proceeds to a STEP 940 whereat the method resets the BT_ACTIVE signal to a low or a logical zero (i.e., inactive), which enables 802.11 transmissions. Thus, the Bluetooth™ protocol transmissions are protected from interruptions from 802.11 transmission. After the STEP 940 the method returns to the STEP 910.

SUMMARY

In summary, the present invention is a method and apparatus for a dual-mode radio (DMR) in a wireless communication system. The present invention provides coexistence between Bluetooth™ protocol and 802.11 protocol devices operating in a DMR.

The present inventive method classifies Bluetooth™ and 802.11 protocol events according to importance. In accordance with a basic DMR method, the present invention assigns two levels of importance or priority to Bluetooth™ events: "high" and "low". In an enhanced DMR method, the present invention assigns three levels of importance or priority to Bluetooth™ events: high, low and promotable.

The present inventive apparatus includes an 802.11 protocol device and a Bluetooth™ protocol device. The 802.11 protocol device includes an 802.11 radio and an 802.11 medium access control (MAC). The Bluetooth™ protocol device includes a Bluetooth™ radio and a Bluetooth™ MAC. The present inventive apparatus provides a means for disabling 802.11 transmissions when high-priority Bluetooth™ events are detected. In one embodiment, the Bluetooth™ MAC transmits Tx (transmit) disable commands directly to the 802.11 radio. In another embodiment, the Bluetooth™

MAC transmits Tx disable commands to the 802.11 MAC, which subsequently transmits Tx disable commands to the 802.11 radio.

A number of embodiments of the present invention have been described. Nevertheless, it will be understood that various modifications may be made without departing from the spirit and scope of the invention. For example, the present inventive method and apparatus can be utilized with virtually any wireless communication application that uses a dual-mode radio. Accordingly, it is to be understood that the invention is not to be limited by the specific illustrated embodiments, but only by the scope of the appended claims.

What is claimed is:

1. A method of implementing a dual-mode radio (DMR) in a wireless communication system, wherein the communication system includes a plurality of dual-mode radios, and wherein the DMR includes a Bluetooth™ radio, an 802.11 radio, and an antenna, and wherein the Bluetooth™ radio is in communication with a Bluetooth™ medium access control (MAC), and wherein the 802.11 radio is in communication with an 802.11 MAC, comprising the acts of:
   (a) determining whether a Bluetooth™ event is a low-priority event or a high-priority event;
   (b) operating the Bluetooth™ radio in an unprotected mode of operation if the Bluetooth™ event is a low-priority event;
   (c) operating the Bluetooth™ radio in a protected mode of operation if the Bluetooth™ event is a high-priority event; and
   (d) returning to the act (a);
wherein the 802.11 radio is disabled while the Bluetooth™ radio transmits and receives data in a protected mode of operation; and
wherein the Bluetooth™ radio disables transmissions by the 802.11 radio during the act (c).

2. The method of claim 1, wherein the act of operating the Bluetooth™ radio in a protected mode of operation comprises setting a BT_ACTIVE signal to a logical high value, the BT_ACTIVE signal disabling the 802.11 device from transmitting when set to a logical high value.

3. The method of claim 1, wherein the act of operating the Bluetooth™ radio in a protected mode of operation comprises the following sub-acts:
   (1) setting a BT_ACTIVE signal to a logical high value, the BT_ACTIVE signal disabling the 802.11 device from transmitting when set to a logical high value;
   (2) transmitting the Bluetooth™ event;
   (3) receiving a Bluetooth™ data signal; and
   (4) setting the BT_ACTIVE signal to low.

4. A method of implementing a dual-mode radio (DMR) in a wireless communication system, wherein the communication system includes a plurality of dual-mode radios, and wherein the DMR includes a Bluetooth™ radio, an 802.11 radio, and an antenna, and wherein the Bluetooth™ radio is in communication with a Bluetooth™ medium access control (MAC), and wherein the 802.11 radio is in communication with an 802.11 MAC, comprising the acts of:
   (a) determining whether a Bluetooth™ event is a low-priority event or a high-priority event;
   (b) operating the Bluetooth™ radio in an unprotected mode of operation if the Bluetooth™ event is a low-priority event;
   (c) operating the Bluetooth™ radio in a protected mode of operation if the Bluetooth™ event is a high-priority event; and
   (d) returning to the act (a);
wherein the act (b) of operating the Bluetooth™ radio in an unprotected mode of operation comprises the following sub-acts:
   (1) determining whether the 802.11 radio is idle;
   (2) returning to act (a) if the 802.11 radio is not idle;
   (3) transmitting the Bluetooth™ event in a protected mode of operation and receiving a Bluetooth™ data signal in an unprotected mode if the 802.11 radio is idle; and
   (4) returning to the act (a).

5. The method of claim 4, wherein the sub-act (3) comprises the following sub-acts:
   (a) setting a BT_ACTIVE signal to a logical high value, the BT_ACTIVE signal disabling the 802.11 device from transmitting when set to a logical high value;
   (b) transmitting the Bluetooth™ event;
   (c) setting the BT_ACTIVE signal to a logical low value; and
   (d) receiving a Bluetooth™ data signal.

6. A method of implementing a dual-mode radio (DMR) in a wireless communication system, wherein the communication system includes a plurality of dual-mode radios, and wherein the DMR includes a Bluetooth™ radio, an 802.11 radio, and an antenna, and wherein the Bluetooth™ radio is in communication with a Bluetooth™ medium access control (MAC), and wherein the 802.11 radio is in communication with an 802.11 MAC, comprising the acts of:
   (a) determining whether a Bluetooth™ event is a low-priority event or a high-priority event;
   (b) operating the Bluetooth™ radio in an unprotected mode of operation if the Bluetooth™ event is a low-priority event;
   (c) operating the Bluetooth™ radio in a protected mode of operation if the Bluetooth™ event is a high-priority event; and
   (d) returning to the act (a);
wherein the act (b) of operating the Bluetooth™ radio in an unprotected mode of operation comprises the following sub-acts:
   (1) receiving a Bluetooth™ data signal in an unprotected mode of operation;
   (2) determining whether the 802.11 radio is idle;
   (3) returning to the act (a) if the 802.11 radio is determined not idle;
   (4) transmitting the Bluetooth™ event in a protected mode if the 802.11 radio is determined to be idle; and
   (5) returning to the act (a).

7. The method of claim 6, wherein the sub-act (4) comprises the following sub-acts:
   (a) setting a BT_ACTIVE signal to a logical high value, the BT_ACTIVE signal disabling the 802.11 device from transmitting when set to a logical high value;
   (b) transmitting the Bluetooth™ event; and
   (c) setting the BT_ACTIVE signal to a logical low value.

8. The method of claim 1, wherein a Bluetooth™ event is determined to be a low-priority event if the Bluetooth™ event comprises a non-time critical Bluetooth event.

9. The method of claim 1, wherein a Bluetooth™ event is determined to be a high-priority event if the Bluetooth™ event is short in duration and has low duty cycles.

10. The method of claim 1, wherein a Bluetooth™ event is determined to be a high-priority event in act (a) if the Bluetooth™ event comprises one of the following events: "sniff" instant, park beacon, "keep alive" null, page response/inquiry response sequence, page scanning/inquiry scanning, master slave switch, LMP message, paging, inquiry, transmission to prevent link supervision timeout, high priority L2CAP traffic, un-hold, "un-sniff", or "un-park".

11. The method of claim 10, wherein a "sniff" event is assigned a different priority than a human interface device (HID) event.

12. The method of claim 1, wherein a ratio of Bluetooth™ communications to 802.11 communications approximates 80 to 20.

13. The method of claim 1, wherein the Bluetooth™ radio is guaranteed to have a minimum bandwidth allocation.

14. The method of claim 1, wherein the act of operating the Bluetooth™ radio in an unprotected mode of operation comprises the sub-acts of:
  (1) determining whether to promote the Bluetooth™ event from a low-priority event to a high-priority event; and
  (2) operating the Bluetooth™ radio in an unprotected mode of operation if the Bluetooth™ event is a low-priority event.

15. A method of implementing a dual-mode radio (DMR) in a wireless communication system, wherein the communication system includes a plurality of dual-mode radios, and wherein the DMR includes a Bluetooth™ radio, an 802.11 radio, and an antenna, and wherein the Bluetooth™ radio is in communication with a Bluetooth™ medium access control (MAC), and wherein the 802.11 radio is in communication with an 802.11 MAC, comprising the acts of:
  (a) determining whether a Bluetooth™ event is a low-priority event or a high-priority event;
  (b) operating the Bluetooth™ radio in an unprotected mode of operation if the Bluetooth™ event is a low-priority event;
  (c) operating the Bluetooth™ radio in a protected mode of operation if the Bluetooth™ event is a high-priority event; and
  (d) returning to the act (a);
wherein the act (b) of operating the Bluetooth™ radio in an unprotected mode of operation comprises the sub-acts of:
  (1) determining whether to promote the Bluetooth™ event from a low-priority event to a high-priority event; and
  (2) operating the Bluetooth™ radio in an unprotected mode of operation if the Bluetooth™ event is a low-priority event; wherein low-priority page scanning/inquiry scanning events are promoted to high priority only during specified time intervals.

16. The method of claim 14, wherein the determination of whether to promote the Bluetooth™ event from a low-priority event to a high-priority event defined in sub-act (1) is based upon at least one Quality of Service (QoS) parameter.

17. The method of claim 16, wherein the at least one QoS parameter comprises a service type.

18. The method of claim 16, wherein the at least one QoS parameter comprises a token rate.

19. The method of claim 16, wherein the at least one QoS parameter comprises a channel latency parameter.

20. A dual-mode radio (DMR) for use in a wireless communication system, comprising:
  (a) an 802.11 communication device comprising an 802.11 medium access control (MAC) device and an 802.11 radio;
  (b) a Bluetooth™ communications device, operatively coupled to the 802.11 communications device, wherein the 802.11 device transmits a status signal to the Bluetooth™ device comprising a Bluetooth™ medium access control (MAC) and a Bluetooth™ radio, and wherein the Bluetooth™ MAC directly transmits a transmit disable signal to the 802.11 radio, the transmit disable signal bypassing the 802.11 MAC device;
  (c) an antenna comprising at least one antenna element, operatively coupled to the Bluetooth™ device; and
  (d) an antenna comprising at least one antenna element, operatively coupled to the 802.11 device.

21. The DMR of claim 20, wherein the Bluetooth™ device comprises:
  (1) a Bluetooth™ medium access control (MAC), wherein the Bluetooth MAC receives the status signal from the 802.11 device, and wherein the Bluetooth™ MAC selectively transmits the transmit disable signal to the 802.11 device; and
  (2) a Bluetooth™ radio, operatively coupled to the Bluetooth™ MAC and the Bluetooth™ antenna.

22. The DMR of claim 21, wherein the Bluetooth™ radio comprises:
  (1) a radio element, operatively coupled to the Bluetooth™ MAC;
  (2) a transmit port, operatively coupled to the radio element;
  (3) a receive port, operatively coupled to the radio element; and
  (4) a first bandpass filter, operatively coupled to the transmit port, the receiver port and the antenna switch.

23. The DMR of claim 21, wherein the Bluetooth™ MAC comprises:
  (1) a MAC element, operatively coupled to the Bluetooth™ radio; and
  (2) a plurality of GPIO input/output ports, operatively coupled to the 802.11 device.

24. The DMR of claim 21, wherein the 802.11 MAC comprises:
  (1) an 802.11 MAC element; and
  (2) a plurality of output ports, operatively coupled to both the Bluetooth™ MAC and the 802.11 radio.

25. A dual-mode radio (DMR) for use in a wireless communication system, comprising:
  (a) an 802.11 communication device
  (b) a Bluetooth™ communications device, operatively coupled to the 802.11 communications device, wherein the 802.11 device transmits a status signal to the Bluetooth™ device, and wherein the Bluetooth MAC device selectively transmits a transmit disable signal to the 802.11 device;
  (c) an antenna comprising at least one antenna element, operatively coupled to the Bluetooth™ device; and
  (d) an antenna comprising of at least one antenna element, operatively coupled to the 802.11 device;
wherein the Bluetooth™ device comprises:
  (1) a Bluetooth™ medium access control (MAC), wherein the Bluetooth MAC receives the status signal from the 802.11 device, and wherein the Bluetooth™ MAC selectively transmits the transmit disable signal to the 802.11 device; and
  (2) a Bluetooth™ radio, operatively coupled to the Bluetooth™ MAC and the Bluetooth™ antenna;
wherein the 802.11 device comprises:
  (1) an 802.11 medium access control (MAC), wherein the 802.11 MAC transmits the status signal to the Bluetooth™ MAC; and
  (2) an 802.11 radio, operatively coupled to the 802.11 MAC, the Bluetooth™ MAC and the 802.11 antenna, wherein the 802.11 radio receives the transmit disable signal from the Bluetooth™ MAC;
wherein the Bluetooth™ radio comprises:
  (1) a radio element, operatively coupled to the Bluetooth™ MAC;
  (2) a transmit port, operatively coupled to the radio element;

(3) a receive port, operatively coupled to the radio element; and
(4) a first bandpass filter, operatively coupled to the transmit port, the receiver port and the antenna switch; wherein the 802.11 radio comprises:
(1) an 802.11 radio element, operatively coupled to the 802.11 MAC;
(2) a logical OR gate, operatively coupled to the 802.11 MAC, the 802.11 radio element and the Bluetooth™ MAC, wherein the logical OR gate receives signals from the 802.11 MAC and the Bluetooth™ MAC, and wherein the logical OR gate outputs a logical signal to the 802.11 radio element;
(3) a logical AND gate, operatively coupled to the 802.11 MAC, the 802.11 radio element and the Bluetooth™ MAC, wherein the logical AND gate receives signals from the 802.11 MAC and the Bluetooth™ MAC, and wherein the logical AND gate outputs a logical signal to the 802.11 radio element;
(4) a transmit port, operatively coupled to the 802.11 radio;
(5) a receive port, operatively coupled to the 802.11 radio;
(6) a switch control, operatively coupled to the 802.11 radio and the antenna switch, wherein the switch control determines which elements of the antenna are coupled to the transmit port and receive port;
(7) a second bandpass filter, operatively coupled to the receive port and the antenna switch, wherein the second bandpass filter filters a receive signal;
(8) a third bandpass filter, operatively coupled to the transmit port, wherein the third bandpass filter filters a transmit signal;
(9) an amplifier, operatively coupled to the third bandpass filter, wherein the amplifier amplifies the transmit signal; and
(10) a lowpass filter, operatively coupled to the amplifier and the antenna switch, wherein the lowpass filter filters the transmit signal.

26. A dual-mode radio (DMR) apparatus, wherein the DMR includes a Bluetooth™ radio, an 802.11 radio, and an antenna, and wherein the Bluetooth™ radio is in communication with a Bluetooth™ medium access control (MAC) and wherein the 802.11 radio is in communication with an 802.11 MAC, the apparatus further comprising:
(a) means for monitoring for a Bluetooth™ event;
(b) means for, in response to detecting a Bluetooth™ event, determining whether the Bluetooth™ event is a low-priority event or a high-priority event;
(c) means, operatively coupled to the determining means, for transmitting and receiving in a normal mode if the Bluetooth™ event is a low-priority event; and
(d) means, operatively coupled to the determining means, for transmitting and receiving in a protected mode if the Bluetooth™ event is a high-priority event;
wherein the 802.11 radio is disabled while the Bluetooth™ radio transmits and receives data in a protected mode of operation; and
wherein the Bluetooth™ radio disables transmissions by the 802.11 radio during the protected mode of operation.

27. An apparatus for communicating according to the Bluetooth™ protocol, wherein the apparatus includes a Bluetooth™ radio, a second radio for a second protocol, and an antenna, and wherein the Bluetooth™ radio is in communication with a Bluetooth™ medium access control (MAC), and wherein the second radio is in communication with a MAC device for the second protocol, the apparatus comprising:
a detector for monitoring for a Bluetooth™ event;
a classifier for, in response to detecting a Bluetooth™ event, classifying the Bluetooth™ event as a low-priority event or a high-priority event, the apparatus configured to operate in an unprotected mode of operation if the event is classified as a low-priority event, the apparatus further configured to operate in a protected mode of operation if the event is classified as a high-priority event; and
a receiver for receiving a status signal from the second radio;
wherein the second radio is disabled while the Bluetooth™ radio transmits and receives data in the protected mode of operation; and
wherein the Bluetooth™ radio disables transmissions by the second radio during the protected mode of operation.

28. The apparatus of claim 27, the second protocol being the IEEE 802.11 protocol.

29. The apparatus of claim 27, further comprising a transmitter for transmitting a disable signal to the second protocol, the protected mode of operation comprising disabling the second radio.

30. The apparatus of claim 29, the disabling the second radio comprising preventing the second radio from transmitting.

31. The apparatus of claim 27, the event classified as a low-priority event if the event is a non-time critical event.

32. The apparatus of claim 27, the event classified as a high-priority event if the event is short in duration and has a low duty cycle.

33. The apparatus of claim 27, the event classified as a high-priority event if the event comprises one of the following events: "sniff" instant, park beacon, "keep alive" null, page response/inquiry response sequence, page scanning/inquiry scanning, master slave switch, LMP message, paging, inquiry, transmission to prevent link supervision timeout, high priority L2CAP traffic, un-hold, "un-sniff", or "un-park".

34. The apparatus of claim 33, the event classified as a low-priority event if the event is not classified as a high-priority event.

35. The apparatus of claim 27, the apparatus further configured to promote a low-priority event to a high-priority event based on at least one Quality of Service (QoS) parameter.

36. The apparatus of claim 35, the at least one QoS parameter comprising at least one of a service type, a token rate, and a channel latency parameter.

37. A communications apparatus, wherein the apparatus includes a first radio for a first protocol, a second radio for a second protocol, and an antenna, the apparatus further comprising:
a detector for monitoring for an event according to the first protocol;
a classifier for, in response to detecting an event, classifying the event as a low-priority event or a high-priority event, the apparatus configured to operate in an unprotected mode of operation if the event is classified as a low-priority event, the apparatus further configured to operate in a protected mode of operation if the event is classified as a high-priority event;
a receiver for receiving a status signal from the second radio, the unprotected mode of operation comprising delaying transmission of signals using the first radio until the second radio enters an idle state; and
a transmitter for transmitting a disable signal to the second radio, the protected mode of operation comprising disabling the second radio;

wherein the second radio is disabled while the first radio transmits and receives data in the protected mode of operation; and wherein the first radio disables transmissions by the second radio during the protected mode of operation.

38. The apparatus of claim 37, the second radio operating according to the 802.11 protocol.

39. A method for communicating according to the Bluetooth™ protocol, the method comprising:

monitoring for a Bluetooth™ event;

in response to detecting a Bluetooth™ event, classifying the Bluetooth™ event as a low-priority event or a high-priority event, operating in an unprotected mode of operation if the event is classified as a low-priority event;

operating in a protected mode of operation if the event is classified as a high-priority event; and receiving a status signal from a secondary device, the secondary device configured to communicate according to a secondary protocol;

wherein the secondary device is disabled while the Bluetooth™ radio transmits and receives data in the protected mode of operation; and wherein the Bluetooth™ radio disables transmissions by the secondary device during the protected mode of operation.

40. The method of claim 39, the secondary device being an 802.11 device, the secondary protocol being the 802.11 protocol.

41. The method of claim 39, further comprising transmitting a disable signal to the secondary device, the protected mode of operation comprising disabling the secondary device.

42. The method of claim 41, the disabling the secondary device comprising preventing the secondary device from transmitting.

43. The method of claim 39, the event classified as a low-priority event if the event is a non-time critical event.

44. The method of claim 39, the first event classified as a high-priority event if the event is short in duration and has a low duty cycle.

45. The method of claim 39, the event classified as a high-priority event if the event comprises one of the following events: "sniff" instant, park beacon, "keep alive" null, page response/inquiry response sequence, page scanning/inquiry scanning, master slave switch, LMP message, paging, inquiry, transmission to prevent link supervision timeout, high priority L2CAP traffic, un-hold, "un-sniff", or "un-park".

46. The method of claim 45, the event classified as a low-priority event if the event is not classified as a high-priority event.

47. The method of claim 39, the apparatus further configured to promote a low-priority event to a high-priority event based on at least one Quality of Service (QoS) parameter.

48. The method of claim 47, the at least one QoS parameter comprising at least one of a service type, a token rate, and a channel latency parameter.

49. A method of implementing a dual-mode radio in a wireless communication system, the dual-mode radio comprising a first device operating according to a first protocol and a second device operating according to a second protocol, the method comprising:

monitoring for an event according to the first protocol;

in response to detecting an event, determining whether the event for the first protocol is a low-priority event or a high-priority event;

operating the first device in an unprotected mode of operation if the event is a low-priority event; and operating the first device in a protected mode of operation if the event is a high-priority event;

wherein the second device is disabled while the first device transmits and receives data in the protected mode of operation;

wherein the first device disables transmissions by the second device during the protected mode of operation; and wherein the first device is a radio and the second device is a radio.

50. The method of claim 49, the operating the first device in an unprotected mode of operation comprising delaying transmission of the event until the second device enters an idle state.

51. The method of claim 49, the second device providing a logical status signal to the first device to indicate the state of the second device.

52. The method of claim 49, the operating the first device in a protected mode of operation comprising disabling the second device while the first device transmits data.

53. The method of claim 52, the disabling the second device comprising preventing the second device from transmitting.

54. The method of claim 52, wherein the first device disables the second device by providing a logical signal to the second device.

55. The method of claim 49, wherein the event is determined to be a low-priority event if the event is a non-time critical event.

56. The method of claim 49, wherein the event is determined to be a high-priority event if the event is short in duration and has a low duty cycle.

57. The method of claim 49, wherein the first protocol is a Bluetooth™ protocol, and the second protocol is an 802.11 protocol.

58. The method of claim 57, wherein the event is determined to be a high-priority event if the event comprises one of the following events: "sniff" instant, park beacon, "keep alive" null, page response/inquiry response sequence, page scanning/inquiry scanning, master slave switch, LMP message, paging, inquiry, transmission to prevent link supervision timeout, high priority L2CAP traffic, un-hold, "un-sniff", or "un-park".

59. The method of claim 49, further comprising, during operation of the first device in an unprotected mode, determining whether to promote the event from a low-priority event to a high-priority event.

60. A method of implementing a dual-mode radio in a wireless communication system, the dual-mode radio comprising a first device operating according to a first protocol and a second device operating according to a second protocol, the method comprising:

determining whether an event for the first protocol is a low-priority event or a high-priority event;

operating the first device in an unprotected mode of operation if the event is a low-priority event; and operating the first device in a protected mode of operation if the event is a high-priority event;

the method further comprising, during operation of the first device in an unprotected mode, determining whether to promote the first event from a low-priority event to a high-priority event;

wherein low-priority page scanning/inquiry scanning events are promoted to high-priority events only during specified time intervals.

61. The method of claim 59, wherein the determination of whether to promote the event from a low-priority event to a high-priority event is based on at least one Quality of Service (QoS) parameter.

62. The method of claim 61, the at least one QoS parameter comprising at least one of a service type, a token rate, and a channel latency parameter.

63. A dual-mode radio (DMR) for use in a wireless communication system, comprising:
a first device for operation according to a first protocol, the first device comprising a MAC device and a radio of first protocol; and
a second device for operation according to a second protocol, the second device comprising a MAC device and a radio of second protocol, the first device operably coupled to the second device, the second device capable of providing a status signal to the first device, the MAC device of the first device capable of selectively and directly providing a transmit disable signal to the radio of the second device, the transmit disable signal bypassing the MAC device of the second device.

64. The dual-mode radio of claim 63, the first device configured to provide the transmit disable signal to the second device when the first device processes a high-priority event.

65. The dual-mode radio of claim 63, the first device configured to delay transmission of a low-priority event until the second device enters an idle state.

66. The dual-mode radio of claim 65, the first device configured to promote a low-priority event to a high-priority event based on at least one Quality of Service parameter.

67. The dual-mode radio of claim 66, wherein the first protocol is a Bluetooth™ protocol, and the second protocol is an 802.11 protocol.

68. The dual-mode radio of claim 63, the first device comprising a first MAC device and a first radio, the second device comprising a second MAC device and a second radio.

69. A dual-mode radio (DMR) including a first radio for operating according to a first protocol, a second radio for operating according to a second protocol and an antenna, the DMR further comprising:
means for monitoring for an event according to the first protocol;
means for, in response to detecting an event, determining whether the event according to the first protocol is a low-priority event or a high-priority event;
means operably coupled to the determining means for operating in an unprotected mode if the event is a low-priority event;
means operably coupled to the determining means for operating in a protected mode if the event is a high-priority event;
wherein the second radio is disabled while the first radio transmits and receives data in the protected mode of operation; and
wherein the first radio disables transmissions by the second radio during the protected mode of operation.

70. The apparatus of claim 27, the event classified as a high-priority event if the event is a "sniff" instant.

71. The apparatus of claim 27, the event classified as a high-priority event if the event is a park beacon.

72. The apparatus of claim 27, the event classified as a high-priority event if the event is a "keep alive" null.

73. The apparatus of claim 27, the event classified as a high-priority event if the event is a page response or inquiry response sequence.

74. The apparatus of claim 27, the event classified as a high-priority event if the event is a page scanning or inquiry scanning sequence.

75. The apparatus of claim 27, the event classified as a high-priority event if the event is a master slave switch.

76. The apparatus of claim 27, the event classified as a high-priority event if the event is an LMP message.

77. The apparatus of claim 27, the event classified as a high-priority event if the event is a paging event or inquiry event.

78. The apparatus of claim 27, the event classified as a high-priority event if the event is a transmission to prevent link supervision timeout.

79. The apparatus of claim 27, the event classified as a high-priority event if the event is high-priority L2CAP traffic.

80. The apparatus of claim 27, the event classified as a high-priority event if the event is an un-hold event.

81. The apparatus of claim 27, the event classified as a high-priority event if the event is an un-sniff event.

82. The apparatus of claim 27, the event classified as a high-priority event if the event is an un-park event.

83. The method of claim 39, the event classified as a high-priority event if the event is a "sniff" instant.

84. The method of claim 39, the event classified as a high-priority event if the event is a park beacon.

85. The method of claim 39, the event classified as a high-priority event if the event is a "keep alive" null.

86. The method of claim 39, the event classified as a high-priority event if the event is a page response or inquiry response sequence.

87. The method of claim 39, the event classified as a high-priority event if the event is a page scanning or inquiry scanning sequence.

88. The method of claim 39, the event classified as a high-priority event if the event is a master slave switch.

89. The method of claim 39, the event classified as a high-priority event if the event is an LMP message.

90. The method of claim 39, the event classified as a high-priority event if the event is a paging event or inquiry event.

91. The method of claim 39, the event classified as a high-priority event if the event is a transmission to prevent link supervision timeout.

92. The method of claim 39, the event classified as a high-priority event if the event is high-priority L2CAP traffic.

93. The method of claim 39, the event classified as a high-priority event if the event is an un-hold event.

94. The method of claim 39, the event classified as a high-priority event if the event is an un-sniff event.

95. The method of claim 39, the event classified as a high-priority event if the event is an un-park event.

* * * * *

UNITED STATES PATENT AND TRADEMARK OFFICE
CERTIFICATE OF CORRECTION

PATENT NO.         : 7,643,463 B1
APPLICATION NO. : 10/216082
DATED              : January 5, 2010
INVENTOR(S)        : Linsky et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1526 days.

Signed and Sealed this

Twenty-first Day of December, 2010

David J. Kappos
*Director of the United States Patent and Trademark Office*